United States Patent
Imae

(10) Patent No.: US 8,040,817 B2
(45) Date of Patent: Oct. 18, 2011

(54) WIRELESS COMMUNICATION DEVICE, WIRELESS COMMUNICATION METHOD, AND COMPUTER PROGRAM PRODUCT

(75) Inventor: Nozomi Imae, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 738 days.

(21) Appl. No.: 12/145,883

(22) Filed: Jun. 25, 2008

(65) Prior Publication Data

US 2009/0003251 A1   Jan. 1, 2009

(30) Foreign Application Priority Data

Jun. 26, 2007  (JP) .................................. 2007-167313
Jun. 17, 2008  (JP) .................................. 2008-158301

(51) Int. Cl.
*H04J 1/16*   (2006.01)
*H04L 12/56*   (2006.01)

(52) U.S. Cl. ........ 370/252; 370/254; 370/238; 370/389; 370/329

(58) Field of Classification Search .................. 370/237, 370/238, 254, 389, 328, 329
See application file for complete search history.

(56) References Cited

U.S. PATENT DOCUMENTS

| 7,221,646 B2 * | 5/2007 | Kawano et al. ................ 370/218 |
| 2007/0127393 A1 * | 6/2007 | Car ................................. 370/254 |
| 2008/0220785 A1 * | 9/2008 | Schloemer .................... 455/445 |

FOREIGN PATENT DOCUMENTS

JP   2006-186565   7/2006

* cited by examiner

*Primary Examiner* — John Pezzlo

(74) *Attorney, Agent, or Firm* — Oblon, Spivak, McClelland, Maier & Neustadt, L.L.P.

(57) ABSTRACT

A wireless communication device performs a wireless communication with a communication target device via an intermediate device. A route-information obtaining unit obtains communication route information indicating a communication route to the communication target device. A quality-information obtaining unit obtains quality information indicating quality of a signal received by a device included in the communication route indicated by the communication route information. A route selecting unit selects an optimum communication route to the communication target device based on the quality information.

17 Claims, 19 Drawing Sheets

| ID | NODE NAME | POSITION INFORMATION |
|----|-----------|----------------------|
| 01 | NODE 100 | $(P1_x, P1_y)$ |
| 02 | NODE 200 | $(P2_x, P2_y)$ |
| 03 | NODE 300 | $(P3_x, P3_y)$ |
| 04 | NODE 400 | $(P4_x, P4_y)$ |
| 05 | NODE 500 | $(P5_x, P5_y)$ |
| 06 | NODE 600 | $(P6_x, P6_y)$ |
| ... | ... | ... |

| ID | NODE NAME | DISTANCE INFORMATION |
|----|-----------|----------------------|
| 02 | NODE 200 | $d_{100-200}$ |
| 03 | NODE 300 | $d_{100-300}$ |
| 04 | NODE 400 | $d_{100-400}$ |
| 05 | NODE 500 | $d_{100-500}$ |
| 06 | NODE 600 | $d_{100-600}$ |
| ... | ... | ... |

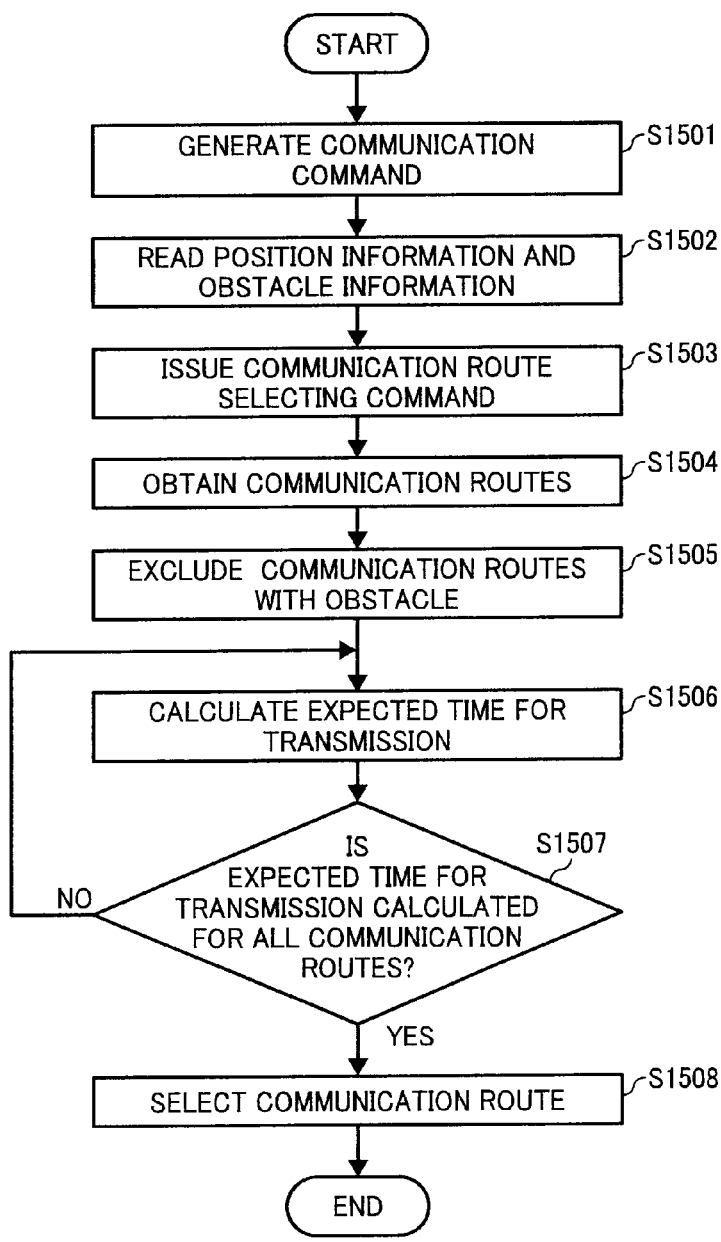

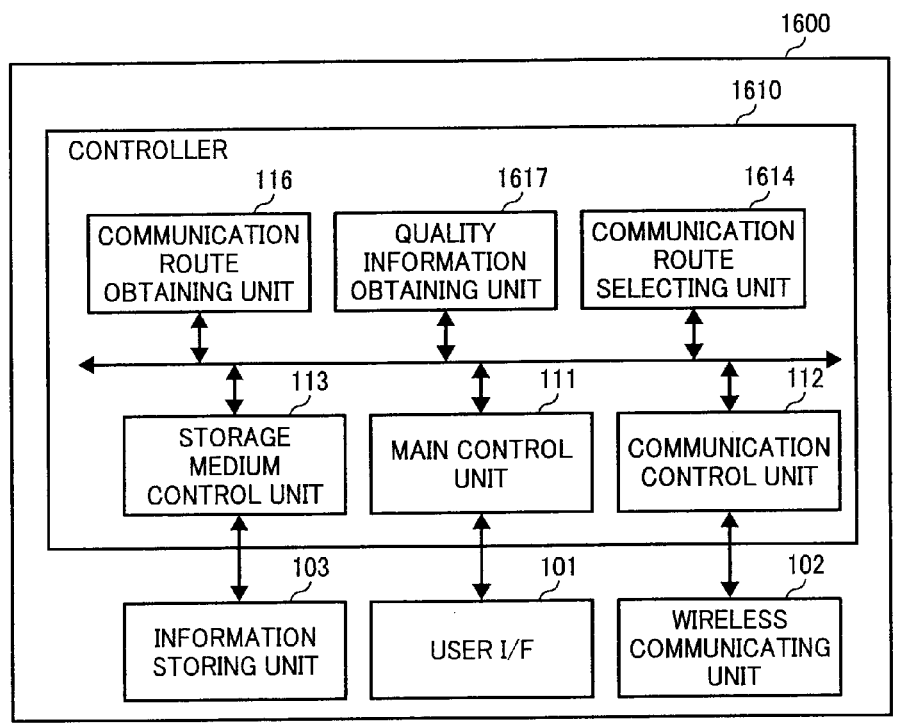

| ID | NODE NAME | DISTANCE INFORMATION | HEIGHTWISE DISTANCE |
|----|-----------|----------------------|---------------------|
| 02 | NODE 200 | $d_{100-200}$ | $h_{100-200}$ |
| 03 | NODE 300 | $d_{100-300}$ | $h_{100-300}$ |
| 04 | NODE 400 | $d_{100-400}$ | $h_{100-400}$ |
| 05 | NODE 500 | $d_{100-500}$ | $h_{100-500}$ |
| 06 | NODE 600 | $d_{100-600}$ | $h_{100-600}$ |
| ... | ... | ... | ... |

| ID | NODE NAME | POWER RECEPTION RATIO (IEEE 802.11a) | POWER RECEPTION RATIO (IEEE 802.11b) | POWER RECEPTION RATIO (IEEE 802.11g) |
|---|---|---|---|---|
| 02 | NODE 200 | $P_{r100-200}/P_{t100}$ | $P_{r100-200}/P_{t100}$ | $P_{r100-200}/P_{t100}$ |
| 03 | NODE 300 | $P_{r100-300}/P_{t100}$ | $P_{r100-300}/P_{t100}$ | $P_{r100-300}/P_{t100}$ |
| 04 | NODE 400 | $P_{r100-400}/P_{t100}$ | $P_{r100-400}/P_{t100}$ | $P_{r100-400}/P_{t100}$ |
| 05 | NODE 500 | $P_{r100-500}/P_{t100}$ | $P_{r100-500}/P_{t100}$ | $P_{r100-500}/P_{t100}$ |
| 06 | NODE 600 | $P_{r100-600}/P_{t100}$ | $P_{r100-600}/P_{t100}$ | $P_{r100-600}/P_{t100}$ |
| ... | ... | ... | ... | ... |

WIRELESS COMMUNICATION DEVICE, WIRELESS COMMUNICATION METHOD, AND COMPUTER PROGRAM PRODUCT

CROSS-REFERENCE TO RELATED APPLICATIONS

The present application claims priority to and incorporates by reference the entire contents of Japanese priority documents 2007-167313 filed in Japan on Jun. 26, 2007 and 2008-158301 filed in Japan on Jun. 17, 2008.

BACKGROUND OF THE INVENTION

1. Field of the Invention

The present invention relates to a wireless communication technology implemented in a mesh network.

2. Description of the Related Art

In recent years, the use of a mesh network for performing wireless communication is being extensively studied. The mesh network is one of the network forms that include a star network, a bus network, a ring network, and the like. More particularly, the mesh network is a reticulate network in which each of a plurality of communication devices can mutually communicate with all other communication devices via a plurality of communication routes. Thus, even if a problem occurs in one of the communication routes, the communication can be performed via the rest of the communication routes. Such a feature facilitates in configuring a failure-resistant mesh network. Moreover, to maintain the communication speed in a mesh network, a communication route can be selected based on the data communication traffic. A common example of a mesh network is a power distribution network or the Internet network.

In a mesh network used for a wireless communication (hereinafter, "wireless mesh network"), direct communication of wireless signals between two communication devices is possible if the communication devices are arranged in a direct communicable range. However, even if the communication devices are arranged out of the direct communicable range, the wireless signals can be communicated by arranging one or more intermediate communication devices therebetween. Furthermore, because large amount of transmission power is necessary to perform direct communication between two distant communication devices, the communication performed via the intermediate communication devices is useful from an energy saving perspective. Meanwhile, such a wireless mesh network can be easily incorporated with a wired network by connecting any one of the communication devices to the wired network. That eliminates the need of a conventional configuration in which an access point, which is connected to the wired network, needs to be installed at the center of the communicable range of a wireless network. Instead, by using a communication device that is arranged near an end limit of the communicable range as the access point for connection with the wired network, the cabling can be restricted to the minimum.

Moreover, it is also possible to easily expand the communicable range of the wireless mesh network. Conventionally, when an access point is installed at the center of the communicable range, the communicable range can be expanded by enhancing the output capacity from the access point or by installing additional access points. Generally, to enhance the output capacity from an access point, it is necessary to replace the device thereat. Similarly, while installing additional access points, it is necessary to lay the communication line up to the additional access points. On the other hand, in the wireless mesh network, the communicable range can be easily expanded by newly arranging a communication device at the desired place for communication outside the current communicable range and supplying power to the newly arranged communication device.

In such a wireless mesh network, a significant factor while performing communication is the selection of a suitable communication route from among a plurality of communication routes. For example, Japanese Patent Application Laid-Open No. 2006-186565 discloses a mesh network in which a separate communication route is allotted for transmission of each signal to prevent overlapping of communication routes. More particularly, consider a case when an intermediate communication device is transmitting a first signal and receives a request for transmission of a second signal, which has a higher priority than the first signal. Then, according to Japanese Patent Application Laid-Open No. 2006-186565, the intermediate communication device transmits the second signal and informs a source communication device of the first signal about the subsequent communication route for the second signal. Based on that information, the first signal is transmitted via another communication route and overlapping of the communication routes is prevented. Such a configuration reduces the throughput of the mesh network in entirety.

Generally, a communication route is selected based on the number of intermediate communication devices arranged therein. The number of intermediate communication devices corresponds to the number of hops taken while transmitting a wireless signal via a communication route. Because an overhead time is generated when each intermediate communication device in a communication route transmits a wireless signal, it is desirable that a communication route having the least number of intermediate communication devices is selected such that the transmission is completed at the earliest. Moreover, the actual time for transmission of a wireless signal from one communication device to another communication device depends on the distance therebetween. By taking into consideration the transmission speed of a wireless signal, the overhead time generated at each intermediate communication device affects the actual time for transmission more than the distance between the source communication device and the destination communication device does.

However, as the distance between two intermediate communication devices in a communication route increases, the transmitted wireless signal gets weaker thereby reducing the reception power of the communication device that receives the wireless signal. Moreover, there is also a possibility that the noise increases during the transmission. Thus, longer the distance between the communication devices, more is the possibility that the signal quality degrades. Consequentially, a signal to noise ratio (SNR) at the communication device that receives the signal also degrades. If an error rate for the wireless signal is at a correctable level, then the actual time for transmission is not substantially affected. However, when the error rate reaches an uncorrectable level, then it becomes necessary to retransmit the signal thereby increasing the actual time for transmission. Thus, to sum up, selecting a communication route having the least number of intermediate communication devices does not guarantee speedy communication of a wireless signal.

SUMMARY OF THE INVENTION

It is an object of the present invention to at least partially solve the problems in the conventional technology.

According to an aspect of the present invention, there is provided a wireless communication device that performs a wireless communication with a communication target device via an intermediate device. The wireless communication device includes a route-information obtaining unit that obtains communication route information indicating a communication route to the communication target device; a quality-information obtaining unit that obtains quality information indicating quality of a signal received by a device included in the communication route indicated by the communication route information; and a route selecting unit that selects an optimum communication route to the communication target device based on the quality information.

Furthermore, according to another aspect of the present invention, there is provided a wireless communication method that is configured to be executed in a wireless communication device that performs a wireless communication with a communication target device via an intermediate device. The wireless communication method includes obtaining communication route information indicating a communication route to the communication target device; obtaining quality information indicating quality of a signal received by a device included in the communication route indicated by the communication route information; and selecting an optimum communication route to the communication target device based on the quality information.

Moreover, according to still another aspect of the present invention, there is provided a computer program product including a computer-usable medium having computer-readable program codes embodied in the medium for performing a wireless communication in a wireless communication device that performs the wireless communication with a communication target device via an intermediate device. The computer-readable program codes when executed cause a computer to execute obtaining communication route information indicating a communication route to the communication target device; obtaining quality information indicating quality of a signal received by a device included in the communication route indicated by the communication route information; and selecting an optimum communication route to the communication target device based on the quality information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a table for explaining an exemplary obstacle database stored in the node shown in FIG. 13;

FIG. 15 is a flowchart for explaining a process of selecting a communication route according to the third embodiment;

FIG. 16 is a schematic diagram for explaining a functional configuration of a node according to a fourth embodiment of the present invention;

FIG. 17 is a table for explaining an exemplary signal quality database stored in the node shown in FIG. 16;

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
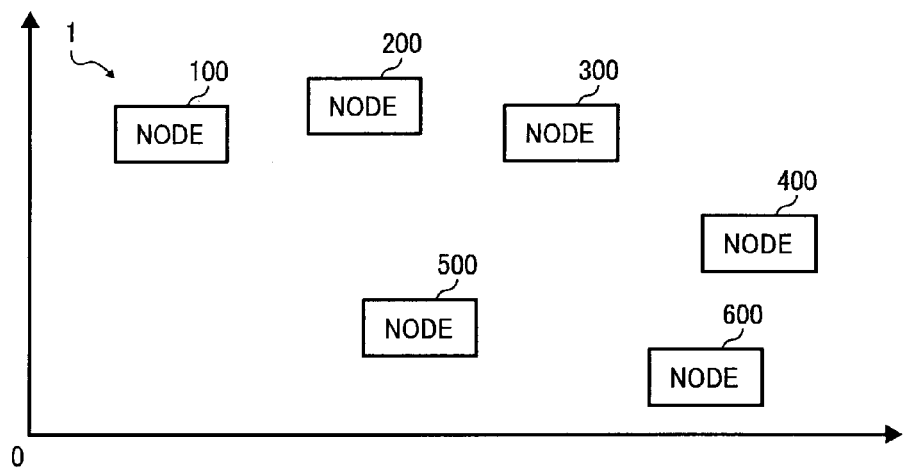
FIG. 1 is a schematic diagram of a wireless mesh network system according to a first embodiment of the present invention.
Figure 2:
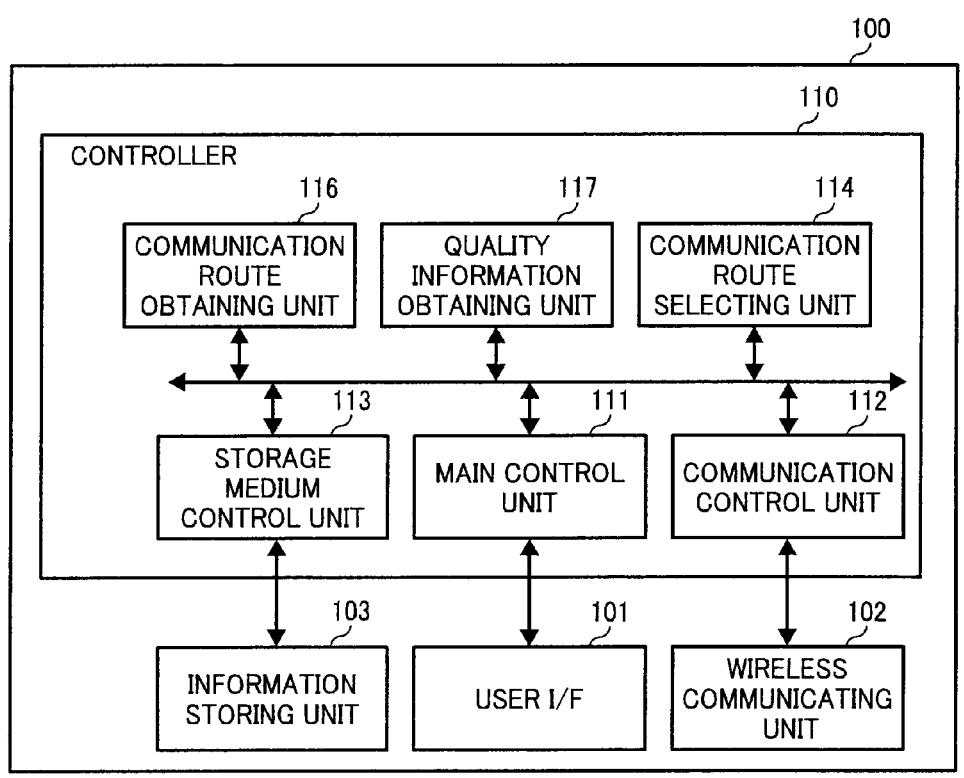
FIG. 2 is a schematic diagram for explaining a functional configuration of a node in the wireless mesh network system.

FIG. 1 is a schematic diagram of a wireless mesh network system 1 according to a first embodiment of the present invention. The wireless mesh network system 1 includes six nodes 100 to 600. Each of the nodes 100 to 600 is a wireless communication device that mutually communicates with every other node to form a reticulate network. FIG. 2 is a schematic diagram for explaining a functional configuration of the node 100. Each of the nodes 200 to 600 has an identical functional configuration as that of the node 100. As shown in FIG. 2, the node 100 includes a user interface (I/F) 101, a wireless communicating unit 102, an information storing unit 103, and a controller 110. The controller 110 includes a main control unit 111, a communication control unit 112, a storage medium control unit 113, a communication route selecting unit 114, a communication route obtaining unit 116, and a quality information obtaining unit 117.

The user I/F 101 includes an operating unit (not shown) such as a keyboard or a mouse that can be used by a user to operate the node 100 and a displaying unit (not shown) such as a monitor on which the status of the node 100 is displayed. The wireless communicating unit 102 includes a communication antenna (not shown) that is used for communication with the other nodes 200 to 600. The information storing unit 103 is a storage medium such as a disk type storage device (e.g., a hard disk drive (HDD) or an optical disk drive) or a non volatile memory (e.g., a read only memory (ROM) or a non volatile random access memory (NV-RAM)). A position database is stored in the information storing unit 103. The position database includes position information of the nodes 100 to 600.

Figures 3, 4:
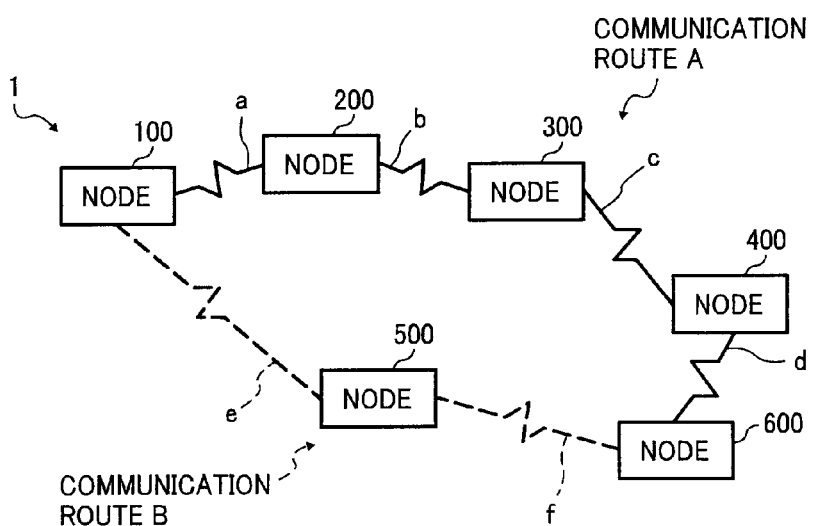
FIG. 3 is a table for explaining an exemplary position database stored in the node.
FIG. 4 is a schematic diagram of a plurality of exemplary communication routes in the wireless mesh network system.

FIG. 3 is a table for explaining an exemplary position database stored in the information storing unit 103. The position database includes an identification ID, a node name, and position information of each of the nodes 100 to 600. The position of each of the nodes 100 to 600 is represented as coordinates with respect to an origin 0. By using the position database, it is possible to obtain the positions of the nodes 200 to 600 with respect to the node 100. Meanwhile, it is also possible to represent an absolute position of each of the nodes 100 to 600 by storing the corresponding latitude and the corresponding longitude as the coordinates.

The controller 110 is configured by a combination of hardware components and software programs. More particularly, the software programs include a control program such as firmware, which is stored in the information storing unit 103 and loaded in a dynamic random access memory (DRAM); while the hardware components include a software control unit, an integrated circuit, and the like that are controlled by a central processing unit (CPU). The controller 110 controls the node 100 in entirety.

The main control unit 111 controls all the constituent elements in the controller 110 and issues commands thereto. When the wireless communicating unit 102 receives a wireless signal or a command from another device, the communication control unit 112 transmits that wireless signal or command to the main control unit 111. On the other hand, the main control unit 111 controls the communication control unit 112 to access other devices via the wireless communicating unit 102. The storage medium control unit 113 receives a command from the main control unit 111 and accordingly stores information in the information storing unit 103 or reads information from the information storing unit 103. The communication route obtaining unit 116 receives a command from the main control unit 111 and accordingly obtains a plurality of communication routes via which a wireless signal can be transmitted to another node. More particularly, the communication route obtaining unit 116 obtains the communication routes by using the position database. The quality information obtaining unit 117 receives a command from the main control unit 111 and accordingly obtains information about the quality of a wireless signal received by intermediate nodes in each of the obtained communication routes and a destination node by using the position database. The communication route selecting unit 114 receives a command from the main control unit 111 and, based on the quality information obtained by the quality information obtaining unit 117, selects a communication route for transmitting a wireless signal to other nodes.

FIG. 4 is a schematic diagram of two exemplary communication routes A and B via which a wireless signal can be transmitted from the node 100 to the node 600. The communication route A includes four inter-node communication paths a, b, c, and d (shown in full lines in FIG. 4), while the communication route B includes two inter-node communication paths e and f (shown in dashed lines in FIG. 4).

Figure 5:
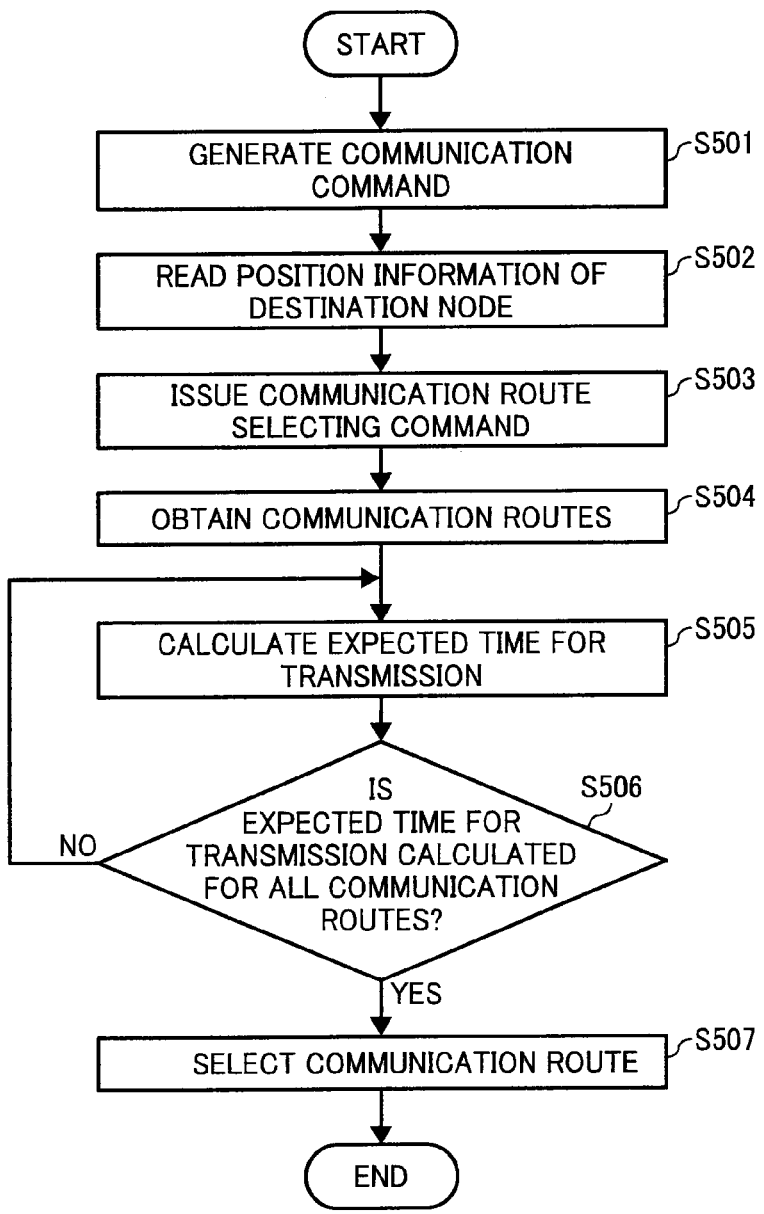
FIG. 5 is a flowchart for explaining a process of selecting a communication route according to the first embodiment.

FIG. 5 is a flowchart for explaining a process of selecting a communication route performed by the node 100. First, a communication command is generated in the node 100 for transmitting a wireless signal to the node 600 (Step S501). Then, the communication route obtaining unit 116 receives a command from the main control unit 111 and controls the storage medium control unit 113 to read the position information of the node 600 from the position database stored in the information storing unit 103 (Step S502). The main control unit 111 then issues a command to the communication route obtaining unit 116 and the communication route selecting unit 114 for selecting a communicating route via which the wireless signal can be transmitted to the node 600 (Step S503). Subsequently, the communication route obtaining unit 116 obtains a plurality of communication routes (i.e., the communication routes A and B) by selecting corresponding intermediate nodes (i.e., the nodes 200, 300, and 400 in the communication route A, and the node 500 in the communication route B) via which the wireless signal can be transmitted to the node 600 (Step S504).

The quality information obtaining unit 117 calculates the total expected time for transmission via each communication route (Step S505). The description of calculating the expected time for transmission is given below in detail. Meanwhile, it is determined whether the expected time for transmission is calculated for each communication route obtained at Step S504 (Step S506). If it is determined that the expected time for transmission is not yet calculated for each communication route (No at Step S506), the process of calculating the expected time for transmission is repeated for all the remaining communication routes (Step S505). If it is determined that the expected time for transmission is calculated for each communication route (Yes at Step S506), the communication route selecting unit 114 selects a communication route that requires the least total expected time for transmission (Step S507).

An expected time for transmission $T_A$ necessary to transmit a wireless signal to the node 600 via the communication route A is obtained by using Equation (1).

$$T_A = t_a + t_b + t_c + t_d + 3 \times t_{OH} \qquad (1)$$

where, $t_a$ to $t_d$ represent expected time for transmission in the inter-node communication paths a, b, c, and d, respectively; while $t_{OH}$ represents an overhead time generated when each of the intermediate nodes 200, 300, and 400 in the communication route A transmits the wireless signal. Thus, the expected time for transmission $T_A$ via the communication route A is calculated by adding the overhead time at each intermediate node to the sum of the expected time for transmission from the node 100 to the node 200, from the node 200 to the node 300, from the node 300 to the node 400, and from the node 400 to the node 600.

Similarly, an expected time for transmission $T_B$ necessary to transmit a wireless signal to the node 600 via the communication route B is obtained by using Equation (2).

$$T_B = t_e + t_f + t_{OH} \tag{2}$$

where, $t_e$ and $t_f$ represent expected time for transmission in the inter-node communication paths e and f, respectively, while $t_{OH}$ represents an overhead time generated when the intermediate node 500 in the communication route B transmits the wireless signal. Thus, the expected time for transmission $T_B$ from the node 100 to the node 600 via the communication route B is calculated by adding the overhead time $t_{OH}$ at the intermediate node 500 to the sum of the expected time for transmission from the node 100 to the node 500 and from the node 500 to the node 600.

In other words, if a source node is numbered to be 0-th, a destination node is numbered to be N-th, and intermediate nodes between the source node and the destination node are sequentially numbered to be 1-st, 2-nd, 3-rd, . . . , (N−1)-th, then a total expected time for transmission T necessary to transmit a wireless signal from the source node to the destination node via the intermediate nodes can be obtained by using Equation (3).

$$T = (N-1) \times t_{OH} + \sum_{n=1}^{N} t_n \tag{3}$$

where, n represents the number of inter-node communication paths in the communication route and $t_n$ represents the expected time for transmission in each of the n number of inter-node communication paths. Meanwhile, the total expected time for transmission T is directly proportional to the total number of intermediate nodes N and to the expected time for transmission $t_n$ in each of the n number of inter-node communication paths.

The expected time for transmission $t_n$ in each of the n number of inter-node communication paths is obtained by using Equation (4).

$$t_n = \frac{C_O}{V_n} + \frac{C_{Rn}}{V_n} \tag{4}$$

where, $V_n$ represents signal transfer efficiency in the n number of inter-node communication paths. $C_O$ represents volume of information to be transmitted from the source node (node 100 in FIG. 4) to the destination node (node 600 in FIG. 4). $C_{Rn}$ represents a retransmission retry count with respect to the wireless signal at the n number of inter-node communication paths. Thus, the expected time for transmission $t_n$ in each of the n number of inter-node communication paths is obtained by calculating the sum of the expected time for transmission of the information ($C_O/V_n$) and the expected time for retransmission of the wireless signal ($C_{Rn}/V_n$). If, e.g., a retransmission retry count $C_{Re}$ in the inter-node communication path e substantially increases, then the expected time for transmission $t_e$ in the inter-node communication path e also increases substantially. In that case, even though the communication route B includes less number of intermediate nodes than the communication route A, there is a possibility that the expected time for transmission $T_B$ via the communication route B is longer than the expected time for transmission $T_A$ via the communication route A. That happens because the expected time for transmission $t_e$ in the inter-node communication path e increases. In other words, by selecting the communication route A, which includes more number of intermediate nodes, over the communication route B, which includes less number of intermediate nodes, there is a possibility that the total expected time for transmission T decreases.

The retransmission retry count $C_{Rn}$ depends on the SNR at each intermediate node and the destination node, which receive the wireless signal. More particularly, the retransmission number $C_{Rn}$ is inversely proportional to the SNR at each node that receives the wireless signal. Thus, when an error rate at such a node degrades, there is possibility that the signal quality degrades to an uncorrectable level. In that case, the wireless signal needs to be retransmitted. For that reason, error correctability is determined, e.g., for each packet of the signal transmission such that the signal retransmission can be performed on a packet basis. The SNR at the node that receives the wireless signal varies according to a reception power value $P_r$ that is obtained by using Equation (5).

$$P_r = \left(\frac{\lambda}{2\pi d_n}\right)^2 P_t \tag{5}$$

where, $P_t$ represents a transmission power value at a node that transmits the wireless signal, $\lambda$ represents a radio wavelength, while $d_n$ represents distance between a node that transmits the wireless signal and a node that receives the wireless signal in each of the n number of inter-node communication paths. Equation (5) indicates that the signal transmission gain of the node that transmits the wireless signal and the node that receives the wireless signal is equal to one. As given in Equation (5), the reception power value $P_r$ is inversely proportional to the square of the distance $d_n$. In other words, the reception power value $P_r$ of the node that receives the wireless signal decreases as the distance $d_n$ from the node that transmits the wireless signal increases. As a result, the SNR at the node that receives the wireless signal degrades.

For that reason, while obtaining the expected time for transmission $t_n$ in each of the n number of inter-node communication paths, the quality information obtaining unit 117 first calculates the distance $d_n$ of each of the n number of inter-node communication paths based on the position database obtained at Step S502. Based on the calculated distance $d_n$, the quality information obtaining unit 117 obtains the reception power value $P_r$ and the SNR of the node that receives the wireless signal. More particularly, because the SNR is proportional to the reception power value $P_r$, the SNR is obtained after obtaining the reception power value $P_r$ by using the proportionality relation. Subsequently, by using the inverse relationship with the SNR, the quality information obtaining unit 117 obtains the retransmission retry count $C_{Rn}$ and then obtains the expected time for transmission $t_n$ by using the retransmission retry count $C_{Rn}$. Thus, the quality information obtaining unit 117 obtains the information about the quality of the wireless signal at each node that receives the wireless signal in the form of the distance $d_n$, the reception power value $P_r$, the SNR, and the $C_{Rn}$ to calculate the expected time for transmission $t_n$ in each of the n number of inter-node communication paths. Subsequently, the quality information obtaining unit 117 obtains the total expected time for transmission T from the source node to the destination node by using Equation (3).

Meanwhile, as described above with reference to FIG. 4, the overhead time $t_{OH}$ in the communication route A is longer than the overhead time $t_{OH}$ in the communication route B (see Equation (1) and Equation (2)). On the other hand, the distance $d_n$ of each of the inter-node communication paths a, b, c, and d in the communication route A is shorter than the distance $d_n$ of either of the inter-node communication paths e and f in the communication route B. Thus, if the reception power value $P_r$ at either one of the nodes 500 and 600 in the communication route B decreases due to the longer distance $d_n$ of the inter-node communication paths e and f (see Equation (5)), then the SNR in the inter-node communication paths e and f degrades thereby increasing the retransmission retry count $C_{Re}$ and a retransmission retry count $C_{Rf}$, respectively (see Equation (4)). As a result, the expected time for transmission $t_e$ and $t_f$ in the inter-node communication paths e and f, respectively, also increases. For that reason, at Step S507, the communication route selecting unit 114 selects the communication route A, which requires less expected time for transmission than the communication route B.

Meanwhile, even with the longer distance $d_n$ of the inter-node communication paths e and f, if the expected time for transmission $T_B$ does not exceed the expected time for transmission $T_A$, then the communication route selecting unit 114 selects the communication route B at Step S507. In this way, based on the expected time for transmission via a plurality of communication routes, a communication route can be selected via which the transmission of a wireless signal can be completed at the earliest.

In the above description, the quality information obtaining unit 117 calculates the total expected time for transmission T via each communication route (see Equation (3)) such that the communication route selecting unit 114 can select a communication route that requires the least total expected time for transmission T. Instead, the quality information obtaining unit 117 can be configured to calculate a signal transfer efficiency value in each of the n number of inter-node communication paths based on the corresponding distance $d_n$. The signal transfer efficiency value can be obtained based on the sum of $C_O$ and $C_{Rn}$. In that case, the quality information obtaining unit 117 can be configured to calculate the average of the signal transfer efficiency values in the n number of inter-node communication paths to obtain the signal transfer efficiency value of the entire communication route. Subsequently, the communication route selecting unit 114 can be configured to compare the signal transfer efficiency values of all the communication routes and select a communication route having the highest signal transfer efficiency value. Such a configuration also enables to select a communication route via which the transmission of a wireless signal can be completed at the earliest. Meanwhile, the communication route selecting unit 114 can be configured to have a threshold for the distance $d_n$ or the SNR such that a communication route in which the distance $d_n$ or the SNR of an inter-node communication path exceeds the corresponding threshold can be excluded while comparing the communication routes.

Moreover, in the above description, the total expected time for transmission T is obtained by using the total number of nodes N and the expected time for transmission $t_n$ in each of the n number of inter-node communication paths. However, it is also possible to obtain the total expected time for transmission T without using the total number of nodes N, i.e., by using only the distance $d_n$ of each of the n number of inter-node communication paths or the expected time for transmission $t_n$ in each of the n number of inter-node communication paths. Such a method is effective when the overhead time $t_{OH}$ is negligible as compared the expected time for transmission $t_n$ in each of the n number of inter-node communication paths.

Furthermore, instead of configuring each node in the wireless mesh network system 1 to be a wireless communication device that can receive and transmit a wireless signal (see FIG. 2), some of the nodes in the wireless mesh network system 1 can be configured to only relay a wireless signal without being able to receive or transmit a wireless signal. The configuration of such relay nodes can be simplified by omitting constituent elements such as the communication route selecting unit 114 and the like that are necessary in a wireless communication device. Moreover, instead of storing in advance the position database in the information storing unit 103, each node can be configured to include a position identifying mechanism such as a global positioning system (GPS) to detect the positions of other nodes. Thus, even if a new node is added to the wireless mesh network system 1, there is no need to manually update the position database in each existing node.

Meanwhile, each of the nodes 100 to 600 can be an information processing device (e.g., a personal computer (PC) or a cellular phone) or an image processing device (e.g., a printer, a scanner, or a multifunction product having printing and scanning functions).

Figures 6, 7:
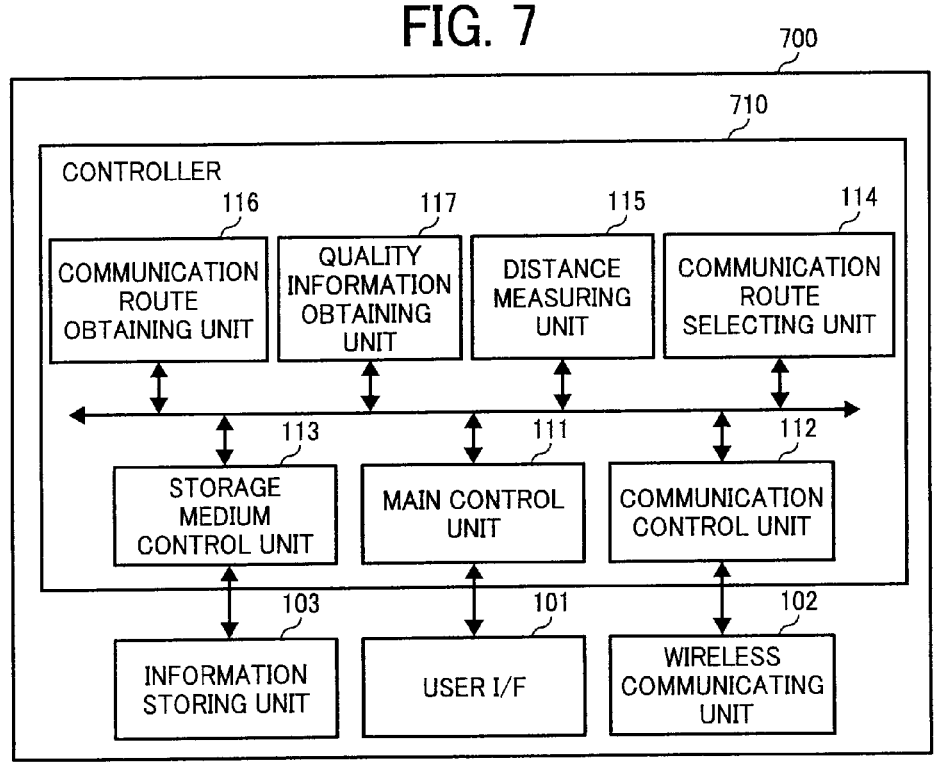
FIG. 6 is a table of an exemplary distance database stored in the node according to a modification of the first embodiment.
FIG. 7 is a schematic diagram for explaining a functional configuration of a node according to a second embodiment of the present invention.

Moreover, in the above description, the coordinates of the nodes 100 to 600 with respect to the origin 0 are stored in the position database such that the node 100 can obtain the positions of the nodes 200 to 600 therefrom. Instead, it is also possible to store a distance database in the information storing unit 103 such that the node 100 can obtain distances from each of the nodes 200 to 600. FIG. 6 is a table of an exemplary distance database stored in the information storing unit 103. The distance database includes the distance of each of the nodes 200 to 600 from the node 100. As described above at Step S505, the quality information obtaining unit 117 calculates the total expected time for transmission T via each communication route based on the distance of the corresponding inter-node communication paths. Thus, when the distance database is stored in the information storing unit 103, the communication route obtaining unit 116 can be configured to obtain the communication routes at Step S504 by using the distance database. Moreover, if a communication route database is stored in the information storing unit 103, then the communication route obtaining unit 116 can be configured to obtain the communication routes at Step S504 by using the communication route database. In such cases, the quality information obtaining unit 117 does not need to calculate the distances between the nodes by referring to the position database. That reduces the processing time. Meanwhile, it is also possible to store an identical position database in each of the nodes 100 to 600 such that each node can obtain the positions of the other nodes. Such a configuration is simpler than storing a separate distance database in each of the nodes 100 to 600. As described above, the position database or the distance database is recorded in advance in each of the nodes 100 to 600 (see FIGS. 3 and 6). It is not complicated to manually update the position database and the distance database when there are only a few nodes in the wireless mesh network system 1. However, as the number of nodes increases, it becomes practically difficult to manually update the information. More particularly, the process of separately updating the distance database in each node is complicated. On the other hand, in the case of using a GPS, it is necessary to arrange a GPS in each node thereby increasing the manufacturing cost of the wireless mesh network system 1. To prevent such problems, the wireless mesh network system 1 can be configured such that each node therein can use a corresponding communication function to independently obtain the positions of other nodes or the distances from the other nodes.

For example, the physical layer of an ultra wide band (UWB) communication such as WiMedia has a distance measuring function that is a high precision function having an error range up to several tens of centimeters. Moreover, although having a lower precision than the UWB, a wireless local area network (LAN) communication protocol such as the IEEE 802.11 standard also has a distance measuring function that obtains an inter-node distance by measuring corresponding reception power value. Thus, if nodes having a similar distance measuring function are used, then it is possible to build a position database as shown in FIG. 3 or a distance database as shown in FIG. 6.

FIG. 7 is a schematic diagram for explaining a functional configuration of a node 700 according to a second embodiment of the present invention. According to the second embodiment, each node in the wireless mesh network system 1 is able to independently obtain the positions of other nodes or the distances with the other nodes. Each of the nodes 200 to 600 according to the second embodiment has an identical functional configuration as that of the node 700. A controller 710 in the node 700 includes a distance measuring unit 115 in addition to the constituent elements descried in the first embodiment. The distance measuring unit 115 operates in tandem with the communication control unit 112 and, based on a result of communication with each of the other nodes 200 to 600, obtains the distances therefrom.

Figure 8:
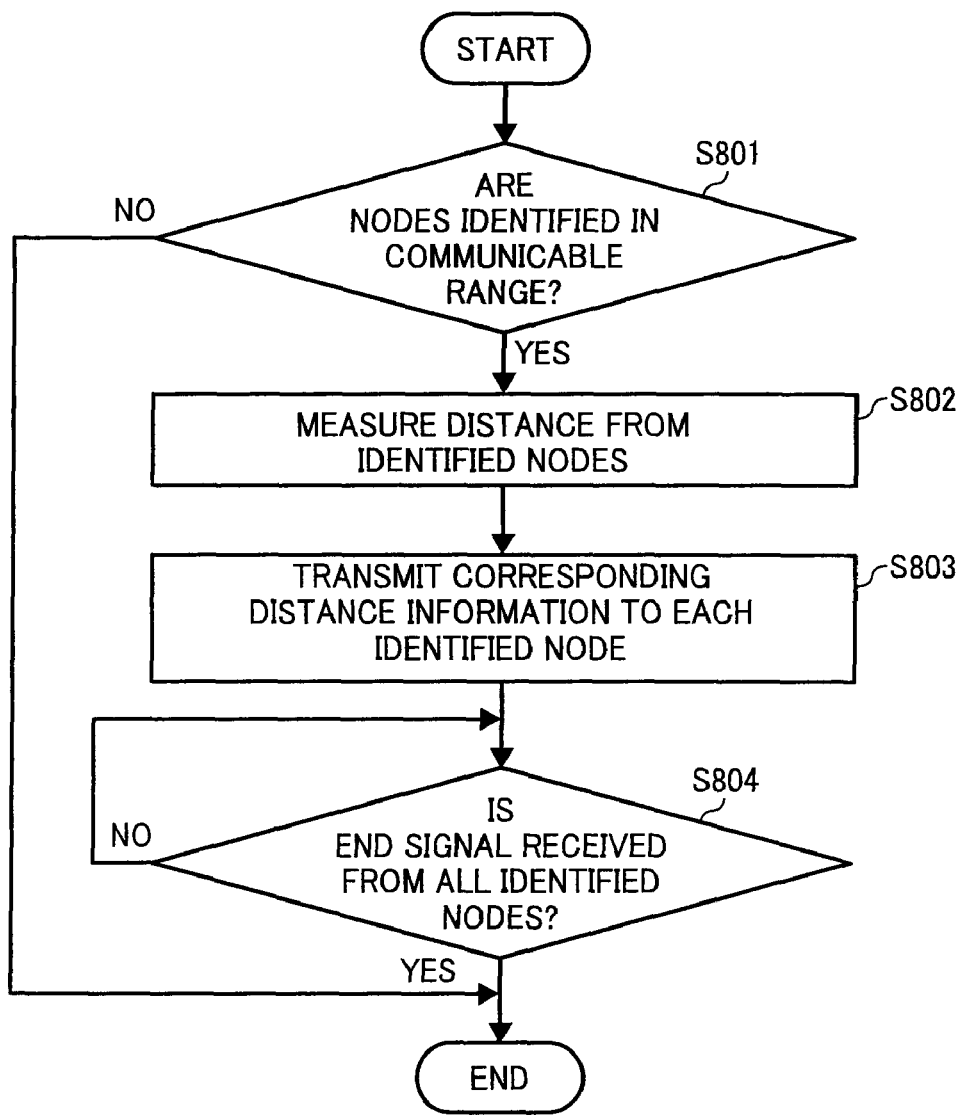
FIG. 8 is a flowchart for explaining a process of obtaining positions of nodes according to the second embodiment.

FIG. 8 is a flowchart for explaining a process performed by the node 700 to independently measure the distances from the nodes 200 to 600. To obtain those distances, first, the main control unit 111 controls the communication control unit 112 to transmit a signal via the wireless communicating unit 102 and identify nodes that are arranged in the communicable range of the node 700 (Step S801). When no node is identified to be in the communicable range of the node 700 (No at Step S801), the process is completed. When one or more nodes are identified to be in the communicable range of the node 700 (Yes at Step S801), the distance measuring unit 115 measures the distance from each identified node (Step S802). Subsequently, the main control unit 111 transmits information regarding the measured distance to each identified node (Step S803). Upon receiving the information, each identified node performs a predetermined operation described hereinafter and transmits back an end signal to the node 700. The main control unit 111 then determines whether each identified node has transmitted an end signal (Step S804). When it is determined that each identified node has transmitted an end signal (Yes at Step S804), the process of measuring the distances is completed.

Figure 9:
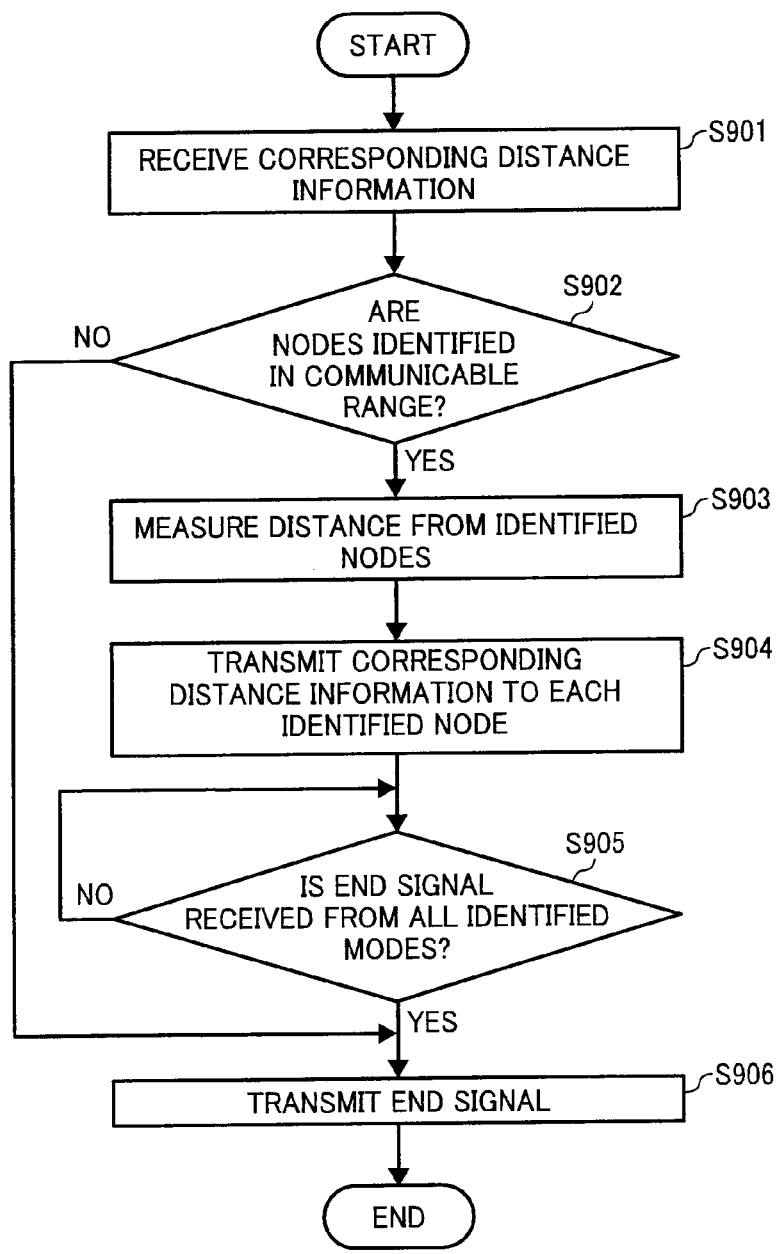
FIG. 9 is a flowchart for explaining another process of obtaining positions of nodes according to the second embodiment.

FIG. 9 is a flowchart for explaining the operations performed by the nodes (one or more of the nodes 200 to 600) that are identified to be in the communicable range of the node 700 at Step S801. The description below is given with reference to the node 200. First, the node 200 receives information regarding the measured distance from the node 700 (Step S901). Then, the main control unit 111 therein controls the corresponding communication control unit 112 to transmit a signal via the corresponding wireless communicating unit 102 such that nodes arranged in the communicable range of the node 200 are identified (Step S902). When no node is identified to be in the communicable range of the node 200 (No at Step S902), the node 200 transmits back an end signal to the node 700 (Step S906) and the process is completed. When one or more nodes are identified to be in the communicable range of the node 200 (Yes at Step S902), the distance measuring unit 115 in the node 200 measures the distance from each identified node (Step S903). Subsequently, the main control unit 111 transmits information regarding the measured distance to each identified node (Step S904). Upon receiving the information, each identified node performs an identical operation to that performed by the node 200 and transmits back an end signal to the node 200. The main control unit 111 then determines whether an end signal is transmitted from each identified node (Step S905). If it is determined that each identified node has transmitted an end signal (Yes at Step S905), the main control unit 111 controls the communication control unit 112 and transmits an end signal to the node 700 via the wireless communicating unit 102 (Step 906), and the process is completed.

In this way, first, the node 700 functions as a parent node and transmits information regarding the measured distance to the node 200 that functions as a child node. Subsequently, the node 200 functions as a parent node and transmits information regarding the measuring distance to other child nodes. In this way, each of the nodes 200 to 700 in the wireless mesh network system 1 can independently measure the distances with the other nodes. Meanwhile, the wireless mesh network system 1 can also be configured such that more than two nodes are defined as standard nodes in which the position database is recorded in advance. Due to such a configuration, the distance information and the position information can be obtained by using a triangulation method. On the other hand, if no standard nodes are defined in advance, then any of the nodes having the position database can be used to obtain the position information by using a triangulation method.

However, in the abovementioned case, if the positions of the standard nodes are varied, it becomes difficult to obtain precise position information. Such a problem occurs when a portable node such as a notebook computer or a cellular phone is used. To solve the problem, a portability flag can be stored in the portable node to make sure that the portable node is not defined as a standard node. In this way, each node in the wireless mesh network system 1 can independently obtain the positions of the other nodes or the distances from the other nodes. Thus, even if a node is newly arranged in the communicable range of the wireless mesh network system 1, the other nodes are able to automatically obtain the position and the distance of the newly arranged node. As a result, the newly arranged node can easily be incorporated in a communication route.

Figure 10:
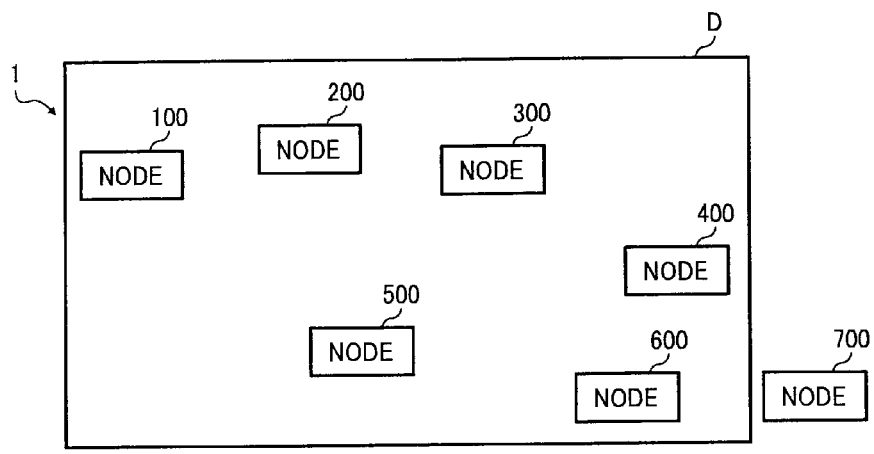
FIG. 10 is a schematic diagram of the wireless mesh network system according to a modification of the second embodiment.

On the other hand, when a node, which is compatible to the wireless mesh network system 1 and has a communication function to independently obtain the positions of other nodes or the distances from the other nodes, is newly arranged in the communicable range of the wireless mesh network system 1, then that node automatically gets incorporated in the wireless mesh network system 1. However, such a configuration is not desirable from the perspective of information security. To solve such a problem, as shown in FIG. 10, a communicable range D is defined for the wireless mesh network system 1 and the information regarding the communicable range D is recorded in the information storing unit 103 of each of the nodes 100 to 600. Thus, in that case, if the node 700 is arranged in the communicable range of the node 600 but outside the communicable range D, then the nodes 100 to 600 consider obtaining the position information of the node 700. As a result, the node 700 is not incorporated in the communicable range D unless a system administrator of the wireless mesh network system 1 allows that to happen.

Figure 11:
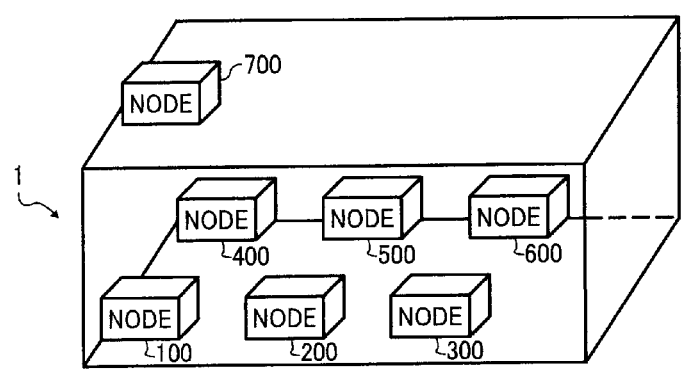
FIG. 11 is a schematic diagram of the wireless mesh network system according to another modification of the second embodiment.

Meanwhile, in the above description with reference to FIGS. 1 and 3, only the coplanar positions of the nodes 100 to 600 are taken into considerations. In addition, it is also possible to take into consideration the heightwise positions of the nodes 100 and 600. By taking into consideration the heightwise positions, it becomes possible to exclude from a communication route a node that is arranged coplanarly close to the other nodes but, e.g., on a different floor partitioned by the ceiling (e.g., the node 700 shown in FIG. 11). In such a case, the wireless signal gets jammed thereby degrading the signal quality. To take into consideration the heightwise positions of the nodes, a three-dimensional communicable range D can be defined for the wireless mesh network system 1.

Moreover, by taking into consideration the heightwise positions, it is also possible to select a communication route that includes nodes arranged at an elevated position near the ceiling because the region near the ceiling is generally free of obstacles such as office equipments or furniture.

Figure 12:
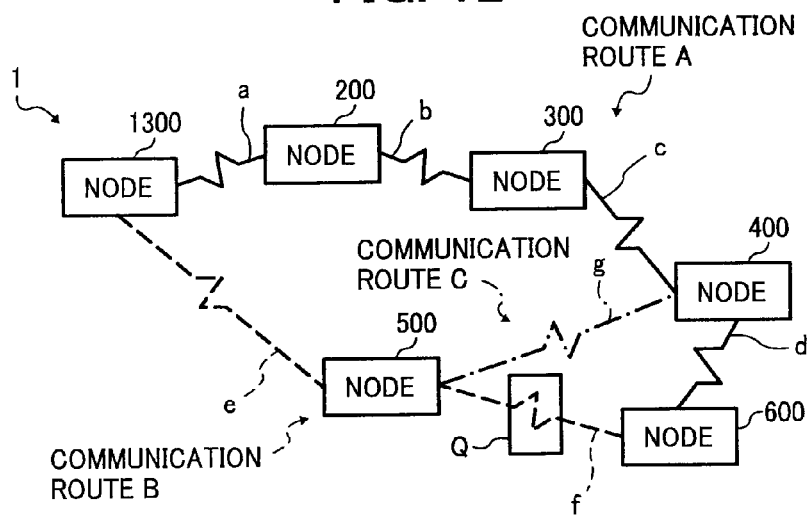
FIG. 12 is a schematic diagram of a plurality of exemplary communication routes in a wireless mesh network system according to a third embodiment of the present invention.

As described above, according to the first embodiment, the total expected time for transmission T is calculated by using the distance $d_n$ of each of the n number of inter-node communication paths. That enables exclusion of a communication route including distantly arranged intermediate nodes. However, even if the intermediate nodes in a communication route are not distantly arranged, the signal transfer efficiency can degrade because of obstacles in the communication route. Such a communication route is unsuitable for speedy communication. Thus, as described hereinafter, it is also necessary to take into consideration the physical environment surrounding the communication routes. FIG. 12 is a schematic diagram of a plurality of communication routes in the wireless mesh network system 1 according to a third embodiment of the present invention. In FIG. 12, the constituent elements having reference numerals identical to those in FIG. 1 have identical configuration as described in the first embodiment. As shown in FIG. 12, a node 1300 can transmit a wireless signal to the node 600 via the communication route A, the communication route B, and a communication route C that includes three inter-node communication paths e, g, and d. Moreover, it is assumed that an obstacle Q lies in the inter-node communication path f in the communication route B.

Figure 13:
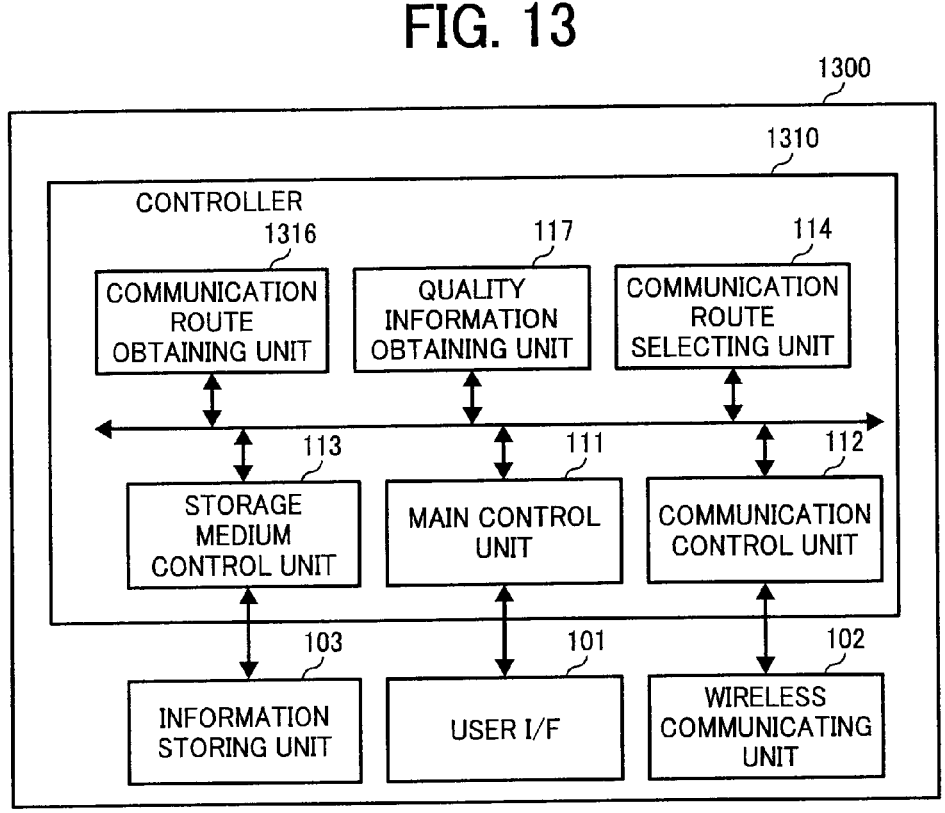
FIG. 13 is a schematic diagram for explaining a functional configuration of a node in the wireless mesh network system according to the third embodiment.

FIG. 13 is a schematic diagram for explaining a functional configuration of the node 1300. Each of the nodes 200 to 600 has an identical functional configuration as that of the node 1300. As shown in FIG. 13, the node 1300 includes the user I/F 101, the wireless communicating unit 102, the information storing unit 103, and a controller 1310. The controller 1310 includes the main control unit 111, the communication control unit 112, the storage medium control unit 113, the communication route selecting unit 114, the quality information obtaining unit 117, and a communication route obtaining unit 1316. Except for the communication route obtaining unit 1316, the constituent elements in the node 1300 have identical configuration as described in the first embodiment.

To select a communication route via which the node 1300 can transmit a wireless signal to the node 600, first, the total expected time for transmission T via each of the communication routes A, B, and C is obtained by using the number of corresponding intermediate nodes and the position database. In that case, generally, it is likely that the communication route B is selected because of having the least total expected time for transmission. However, because of the obstacle Q in the inter-node communication path f, there is a possibility that the actual time for transmission exceeds the total expected time for transmission $T_B$ by a large amount. In other words, because of the obstacle Q in the inter-node communication path f, the wireless signal gets weaker thereby reducing the reception power value $P_r$ of the node 600. As a result, the actual time for transmission in the inter-node communication path f exceeds the expected time for transmission $t_f$, which is obtained based on a distance $d_f$ of the inter-node communication path f. Thus, there is a possibility that the wireless signal is not transmitted at the earliest via the communication route B. To solve such a problem, the communication route obtaining unit 1316 is configured to exclude any communication route that includes an inter-node communication path with an obstacle.

According to the third embodiment, in addition to the position database, an obstacle database is also stored in the information storing unit 103. The obstacle database includes information regarding the positions of obstacles lying in the communicable range of the wireless mesh network system 1. FIG. 14 is a table for explaining an exemplary obstacle database stored in the information storing unit 103. The obstacle database includes an identification ID, an obstacle name, and an interference range of each obstacle that causes degradation in the signal quality. The interference range of each obstacle is a range in which the obstacle interferes with the wireless communication. The interference range is represented as a coordinate range with respect to the origin 0.

FIG. 15 is a flowchart for explaining a process of selecting a communication route performed by the node 1300. First, a communication command is generated in the node 1300 for transmitting a wireless signal to the node 600 (Step S1501). Then, the communication route obtaining unit 1316 receives a command from the main control unit 111 and controls the storage medium control unit 113 to read the position information of the node 600 from the position database stored in the information storing unit 103 (Step S1502).

The main control unit 111 then issues a command to the communication route obtaining unit 1316 and the communication route selecting unit 114 for selecting a communicating route from the node 1300 to the node 600 (Step S1503). Subsequently, the communication route obtaining unit 1316 obtains a plurality of communication routes (i.e., the communication routes A, B, and c) by selecting corresponding intermediate nodes via which the wireless signal can be transmitted to the node 600 (Step S1504). The communication route obtaining unit 1316 then refers to the obstacle database in the information storing unit 103 and excludes the communication routes in which an obstacle recorded in the obstacle database is lying (Step S1505). That is, with reference to FIG. 12, the communication route obtaining unit 1316 excludes the communication route B in which the obstacle Q is lying. Subsequently, similar to Steps S505 to S507 in FIG. 5, a communication route that requires the least total expected time for transmission is determined in Steps S1506 to S1508.

In this way, by excluding the communication routes with an obstacle, a communication route can be efficiently selected via which the transmission of a wireless signal can be completed at the earliest.

In the abovementioned process of selecting a communication route, it is also possible to take into consideration the effect of the obstacles while obtaining the total expected time for transmission at Step S1506. When a wireless signal in interfered by an obstacle in an inter-node communication path, the reception power value $P_r$ of the node that receives the wireless signal in the inter-node communication path decreases, resulting in the degradation of the SNR and increase in the retransmission retry count $C_{Rn}$ of the node. Consequentially, the expected time for transmission $t_n$ in the inter-node communication path increases thereby increasing the total expected time for transmission T of the communication route including the inter-node communication path with the obstacle. To solve such a problem, at Step S1506, the communication route selecting unit 114 takes into consideration the interference of the obstacle Q on the wireless signal in the inter-node communication path f while obtaining the SNR at the node 600, and the retransmission retry count $C_{Rf}$ and the expected time for transmission $t_f$ in the inter-node communication path f. Accordingly, the communication route selecting unit 114 obtains the expected time for transmission $T_B$ and compares that with the expected time for transmission of the other communication routes to select a communication route for transmission.

Meanwhile, although all communication routes with an obstacle are excluded at Step S505, there is a possibility that some of the obstacles do not cause a substantial degradation in the signal quality. Thus, to make sure that only those communication routes are excluded in which an obstacle substantially degrades the signal quality, the effect of the obstacles is taken into consideration while obtaining the expected time for transmission of the communication routes.

As described above in the first embodiment, the total expected time for transmission T of a communication route is obtained by using the distance $d_n$ of each of the n number of inter-node communication paths. Moreover, as described above in the third embodiment, the expected time for transmission $t_n$ in each of the n number of inter-node communication paths is obtained by taking into consideration the effect of a corresponding obstacle. In both cases, the expected time for transmission $t_n$ is obtained by using the reception power value $P_r$, the SNR, and the retransmission retry count $C_{Rn}$ of the corresponding destination node. However, as described hereinafter, the expected time for transmission $t_n$ can also be obtained by using information regarding the signal quality, irrespective of the distance between the nodes in a communication route or whether an obstacle lies in the communication route.

Given below is the description of a method of selecting a communication route in the wireless mesh network system 1 according to a fourth embodiment of the present invention. The description is given with reference to the wireless mesh network system 1 shown in FIG. 12 except that the wireless mesh network system 1 includes a node 1600 instead of the node 1300.

FIG. 16 is a schematic diagram for explaining a functional configuration of the node 1600. Each of the nodes 200 to 600 has an identical functional configuration as that of the node 1600. As shown in FIG. 16, the node 1600 includes the user I/F 101, the wireless communicating unit 102, the information storing unit 103, and a controller 1610. The controller 1610 includes the main control unit 111, the communication control unit 112, the storage medium control unit 113, the communication route obtaining unit 116, a communication route selecting unit 1614, and a quality information obtaining unit 1617. Except for the communication route selecting unit 1614 and the quality information obtaining unit 1617, the constituent elements in the node 1600 have identical configuration as described in the first embodiment.

According to the fourth embodiment, a signal quality database is stored in the information storing unit 103. FIG. 17 is a table for explaining an exemplary signal quality database stored in the information storing unit 103. The signal quality database includes an identification ID, a node name, and a reception power ratio of each of the nodes 200 to 600. The reception power ratio is a ratio of the transmission power value of the node 1600 and the reception power value of each of the nodes 200 to 600. For example, in FIG. 17, the node 1600 is transmits a wireless signal at a transmission power value of $P_{t100}$ while the node 200 receives the wireless signal at a reception power value of $P_{r100\text{-}200}$. Thus, the reception power ratio of the node 200 is $P_{r100\text{-}200}/P_{t100}$.

The quality information obtaining unit 1617 obtains the reception power ratios from the signal quality database and calculates the total expected time for transmission via each communication route by using the reception power ratios. Based on such total expected time for transmission, the communication route selecting unit 1614 selects a communication route via which the transmission of a wireless signal can be completed at the earliest.

Given below is the description of a process of selecting a communication route performed by the node 1600. That process is by and large identical to the process explained with reference to FIG. 5. However, with reference to Step S502, the communication route obtaining unit 116 reads information from the signal quality database instead of the position database. Subsequently, with reference to Step S505, the quality information obtaining unit 1617 calculates the total expected time for transmission T via each communication route by using the reception power ratios in the signal quality database. More particularly, it is possible to obtain the SNR and the retransmission retry count $C_{Rn}$ of a node by using the reception power ratio of that node. Accordingly, the expected time for transmission $t_n$ can be obtained by using Equation (4) and the total expected time for transmission T can be obtained by using Equation (3). Meanwhile, with reference to Step S504, communication routes can be obtained by using information stored in advance or by using the reception power ratios of the nodes 200 to 600.

In this way, by using the reception power ratios to obtain the expected time for transmission via a plurality of communication routes, a communication route can be selected via which the transmission of a wireless signal can be completed at the earliest.

Meanwhile, in addition to the node 1600, each of the nodes 200 to 600 can also be configured to independently obtain the signal quality information. More particularly, in each of the nodes 200 to 600, the communication control unit 112 can be configured to identify the corresponding transmission power value $P_t$ and the corresponding reception power value $P_r$ based on which the main control unit 111 can obtain the signal quality information.

As described with reference to Equation (5), the reception power of a node that receives a wireless signal varies according to the transmission power of a node that transmits the wireless signal. Thus, even if the distance between those two nodes is long, there is still a possibility that a sufficiently large transmission power facilitates in securing a reception power that is sufficient to speedily complete the transmission of the wireless signal. On the other hand, from the perspective of energy saving, it is desirable to reduce the transmission power as much as possible. Considering such conditions, given below is the description according to a fifth embodiment of the present invention in which the transmission power of a node is controlled.

The description is given with reference to the wireless mesh network system 1 shown in FIG. 12 except that the wireless mesh network system 1 includes a node 1800 instead of the node 1300.

Figure 18:
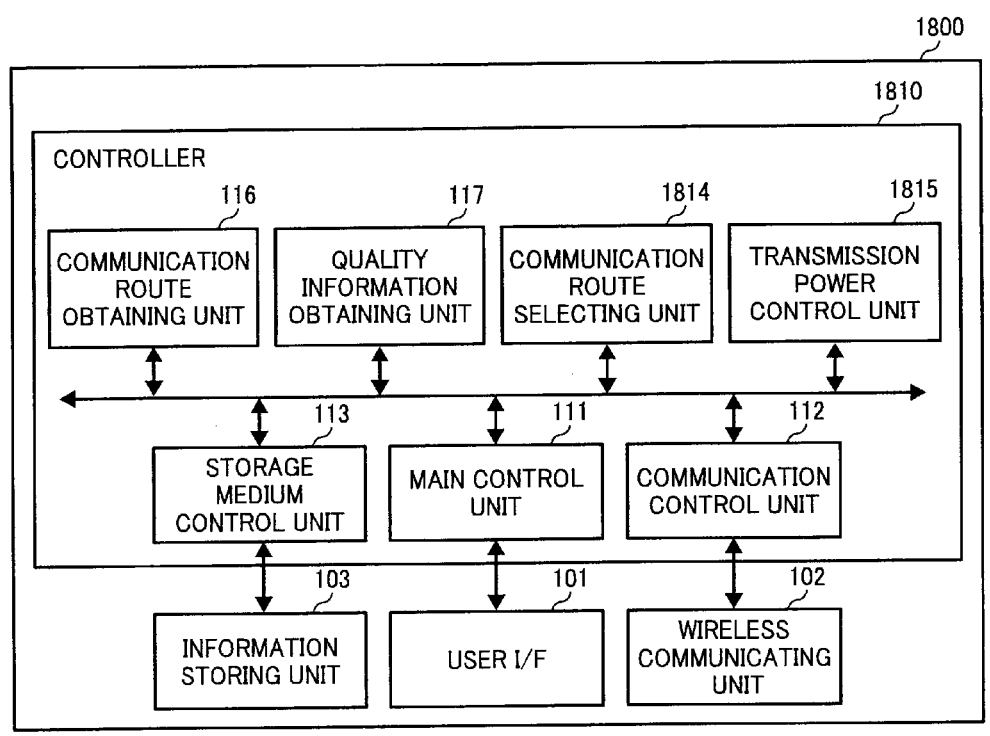
FIG. 18 is a schematic diagram for explaining a functional configuration of a node according to a fifth embodiment of the present invention.

FIG. 18 is a schematic diagram for explaining a functional configuration of the node 1800. Each of the nodes 200 to 600 has an identical functional configuration as that of the node 1800. As shown in FIG. 18, the node 1800 includes the user I/F 101, the wireless communicating unit 102, the information storing unit 103, and a controller 1810. The controller 1810 includes the main control unit 111, the communication control unit 112, the storage medium control unit 113, the communication route obtaining unit 116, the quality information obtaining unit 117, a communication route selecting unit 1814, and a transmission power control unit 1815. Except for the communication route selecting unit 1814 and the transmission power control unit 1815, the constituent elements in the node 1800 have identical configuration as described in the first embodiment.

The transmission power control unit 1815 receives a command from the main control unit 111 and accordingly controls the transmission power value of the node 1800 while transmitting a wireless signal. For example, when the distance between the node 1800 and a destination node for the wireless signal is short, the transmission power control unit 1815 reduces the transmission power value $P_t$ to save energy. On the other hand, when the total number of intermediate nodes N is small and the distance $d_n$ of the inter-node communication paths is long, the transmission power control unit 1815 increases the transmission power value $P_t$ such that the expected time for transmission $t_n$ does not increase. That prevents the decrease in the reception power value $P_r$ and the degradation of the SNR of the destination node thereby speeding up the transmission.

Figure 19:
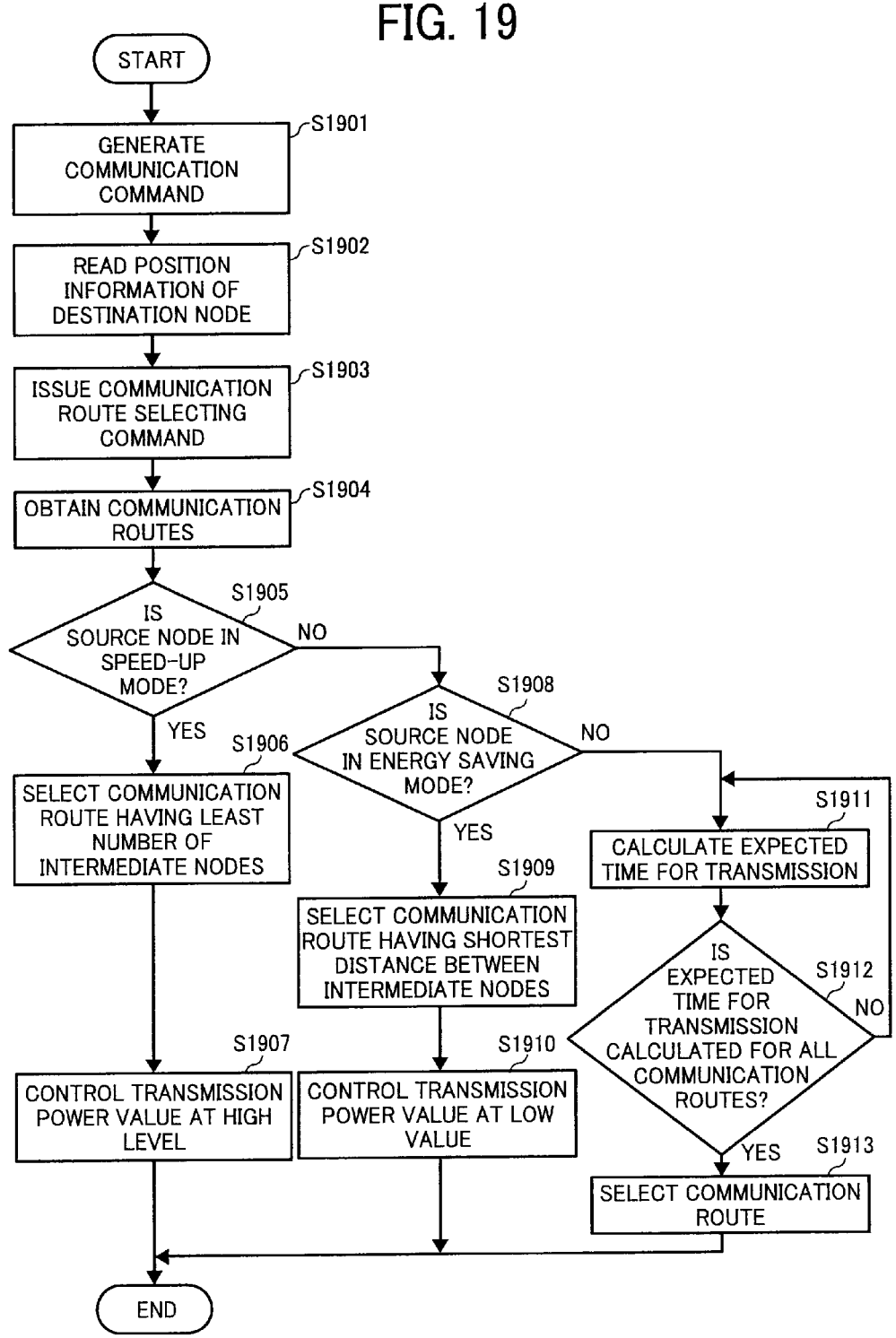
FIG. 19 is a flowchart for explaining a process of selecting a communication route according to the fifth embodiment.

FIG. 19 is a flowchart for explaining a process of selecting a communication route performed by the node 1800. The process is described for an energy saving mode and a speed-up mode of the node 1800 controlled by the transmission power control unit 1815. The process from the generation of a communication command (Step S1901) up to the obtainance of a plurality of communication routes (Step S1904) is identical to the process from Steps S501 to S504 in FIG. 5.

Upon obtaining a plurality of communication routes (Step S1904), it is determined whether the node 1800 is in the speed-up mode (Step S1905). When the node 1800 is determined to be in the speed-up mode (Yes at Step S1905), the communication route selecting unit 1814 selects a communication route that includes the least number of intermediate nodes (Step S1906). The transmission power control unit 1815 then controls the transmission power value at a high level (Step S1907) and the process is completed.

Figure 20:
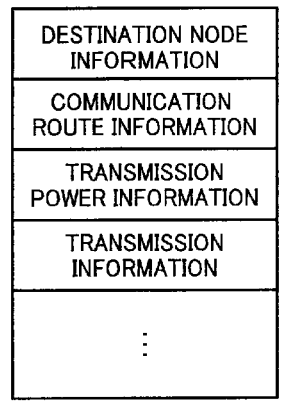
FIG. 20 is a table for explaining information included in a wireless signal transmitted from a source node to a destination node according to the fifth embodiment.

FIG. 20 is a table for explaining the information that is included in a wireless signal transmitted, e.g., from the node 1800 to the node 600. The wireless signal includes destination node information, communication route information, transmission power information, and reception power information. The destination node information is indicated by, e.g., an internet protocol (IP) address of the destination node. The communication route information is information regarding the selected communication route from among the communication routes A, B, and C, and is represented by the nodes therein. For example, the communication route A is represented as "node 1800-node 200-node 300-node 400-node 600".

The transmission power information is information regarding the transmission power value specified for each node at the time of transmission. Moreover, the transmission power value is specified with respect to a standard power value. Meanwhile, it is also possible to specify the standard power value as the actual transmission power value. Each source node transmits the transmission power information to a destination node. At Step S1906 in FIG. 19, the communication B is selected as the communication route that includes the least number of intermediate nodes. Thus, the communication route information regarding the communication route B (node 1800-node 500-node 600) is generated. At Step S1907, the transmission power value larger than the standard power value is set in the transmission power information.

At Step S1905, when the node 1800 is determined not to be in the speed-up mode (No at Step S1905), it is determined whether the node 1800 is in the energy saving mode (Step S1908). When the node 1800 is determined to be in the energy saving mode (Yes at Step S1908), then the communication route selecting unit 1814 selects a communication route that includes the shortest inter-node communication paths (Step S1909). Herein, a communication route that includes the shortest inter-node communication paths means either a communication route in which the distance between two nodes in each intermediate communication path is shortest or a communication node having the least average distance. Thus, at Step S1909, the communication route A is selected and the communication route information thereof is generated as "node 1800-node 200-node 300-node 400-node 600". The transmission power control unit 1815 then controls the transmission power value at a low level (Step S1910) and the process is completed. That is, at Step S1910, the transmission power value smaller than the standard power value is set in the transmission power information.

When the node 1800 is determined to be neither in the speed-up mode (No at Step S1905) nor in the energy saving mode (No at Step S1908), then the communication route selecting unit 1814 calculates the total expected time for transmission for all communication routes (Steps S1911 and S1912) and selects a communication route that requires the least total expected time for transmission (Step S1913).

When a communication route is selected, the wireless communicating unit 102 is activated based on the information generated in the communication control unit 112 (see FIG. 20). That is, when the node 1800 is in the speed-up mode, the transmission power value from the wireless communicating unit 102 is set higher than the standard power value for transmitting a wireless signal via the communication route B. Upon receiving the wireless signal along with the transmission power information, the intermediate node 500 transfers the wireless signal to the node 600 after setting the transmission power value based on the received transmission power information. Although the distance $d_e$ of the intermediate communication path e is longer than that of the intermediate communication paths a to d in the communication route A and the obstacle Q lies in the inter-node communication path f (see FIG. 12), the reception power value $P_r$ of the node 600 can be maintained at a high level because the intermediate node 500 sets the transmission power value at a high level. Moreover, because the communication route B includes the least number of intermediate nodes, the overhead time $t_{OH}$ in the communication route B is minimized thereby speeding up the transmission. Meanwhile, each transmission method generally has an independent standard regarding the upper limit of the transmission power value. Thus, in the abovementioned case, the transmission power value cannot be set higher than the upper limit. However, the abovementioned process can be performed when the standard power value is set to be smaller than the upper limit for the purpose of saving energy.

On the other hand, when the node 1800 is in the energy saving mode, the transmission power value from the wireless communicating unit 102 is set lower than the standard power value and a wireless signal is transmitted via the communication route A. That is, the intermediate nodes 200, 300, and 500 receive a wireless signal along with the transmission power information and, after setting the transmission power value based on the received transmission power information, transmit the wireless signal to the node 600. Because each of the inter-node communication paths a, b, c, and d is short, the rate of reduction in the reception power value at each of the nodes 200, 300, 500, and 600 is small. Thus, by using the energy saving mode, it is possible to transmit the wireless signal at a low transmission power value.

In this way, according to the fifth embodiment, on one hand, it is possible to save energy by controlling the transmission power at each node; while on the other hand, it is possible to speed up the transmission even when a communication route has a high rate of degradation in the signal quality.

Meanwhile, instead of controlling the transmission power of a node that transmits a wireless signal, the abovementioned object can also be achieved by controlling a signal reception gain at each node that receives the wireless signal. When a node is controlled to transmit a wireless signal with a transmission power value higher than the standard power value, it is assumed that the corresponding communication route has a high rate of degradation in the signal quality. However, there is a possibility that the inter-node communication paths in the communication route are short and without any obstacle. As a result, the signal quality does not degrade substantially. In that case, transmitting a wireless signal at a high transmission power value leads to wastage of energy. To avoid such a problem, the transmission power value can be determined based on the distances of the inter-node communication paths in a communication route as well as the reception power ratios of the nodes therein.

As described above, each intermediate node transmits a wireless signal based on the transmission power information generated by a source node. Instead, each intermediate node can be configured to independently determine the transmission power based on the distance of the corresponding inter-node communication path as well as the reception power ratio of the subsequent node.

Given below is the description of the wireless mesh network system 1 according to a sixth embodiment of the present invention in which the distance database is updated automatically.

The description is given with reference to the wireless mesh network system 1 shown in FIG. 12 except that the wireless mesh network system 1 includes a node 2100 instead of the node 1300.

Figure 21:
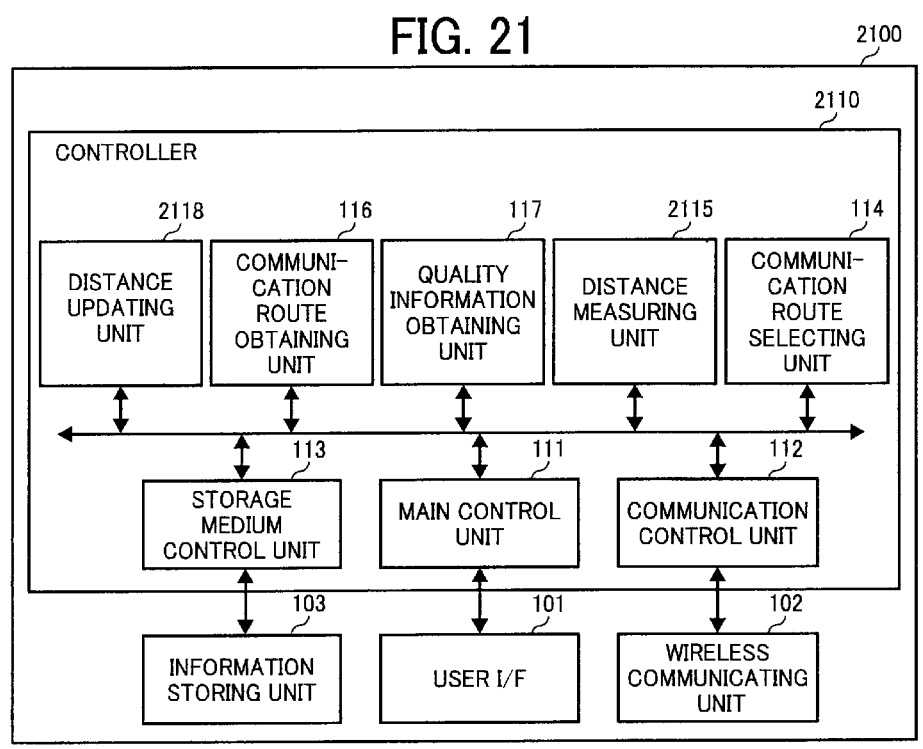
FIG. 21 is a schematic diagram for explaining a functional configuration of a node according to a sixth embodiment of the present invention.

FIG. 21 is a schematic diagram for explaining a functional configuration of the node 2100. Each of the nodes 200 to 600 has an identical functional configuration as that of the node 2100. As shown in FIG. 21, the node 2100 includes the user I/F 101, the wireless communicating unit 102, the information storing unit 103, and a controller 2110. The controller 2110 includes the main control unit 111, the communication control unit 112, the storage medium control unit 113, the communication route selecting unit 114, the communication route obtaining unit 116, the quality information obtaining unit 117, a distance measuring unit 2115, and a distance updating unit 2118. Except for the distance measuring unit 2115 and the distance updating unit 2118, the constituent elements in the node 2100 have identical configuration as described in the first embodiment.

According to the sixth embodiment, a distance database identical to that shown in FIG. 6 is stored in the information storing unit 103. In the distance database, the distance of each of the nodes 200 to 600 from the node 2100 is recorded. Moreover, it is assumed that at least one of the nodes 200 to 600 is arranged at a fixed position.

The distance measuring unit 2115 measures the distance from the node arranged at the fixed position by using any known method proposed in a communication protocol. Subsequently, the distance updating unit 2118 determines whether the distance from the fixed position of the node is identical to that recorded in the distance database. When the distance from the fixed position of the node is determined to be different, then the distance updating unit 2118 updates the distance database with the new distance. Meanwhile, the process of selecting a communication route is identical to the process described in the first embodiment.

Figure 22:
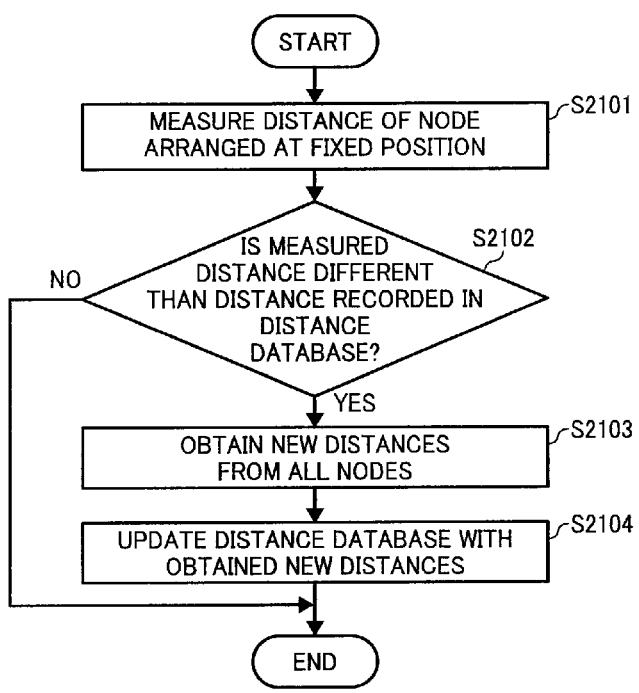
FIG. 22 is a flowchart for explaining a process of updating a distance database according to the sixth embodiment.

FIG. 22 is a flowchart for explaining a process of updating the distance database. The process is repeated at a regular time interval in the node 2100 as well as in each of the nodes 200 to 600.

In the node 2100, first, the distance measuring unit 2115 measures the distance from a node arranged at a fixed position (Step S2101). Subsequently, the distance updating unit 2118 determines whether the distance from the fixed position of the node is different than that recorded in the distance database (Step S2102). When the distance from the fixed position of the node is determined to be the same (No at Step S2102), then the distance updating unit 2118 certifies that the node 2100 is not moved from the previous recorded position and the process is completed.

When the distance from the fixed position of the node is determined to be different (Yes at Step 2102), then the distance updating unit 2118 certifies that the node 2100 is moved to a new position and obtains new distances from each of the nodes 200 to 600 (Step S2103). Subsequently, the distance updating unit 2118 updates the distance database with the new distances (Step S2104).

In this way, the distance database is updated when the node 2100 is moved to a new position.

Meanwhile, instead of updating the distance database, it is also possible to update a position database identical to that shown in FIG. 3.

Given below is the description of the wireless mesh network system 1 according to a seventh embodiment of the present invention in which a position database is updated by deleting the position information of a node that is determined to be lying outside the communicable range D.

The description is given with reference to the wireless mesh network system 1 shown in FIG. 12 except that the wireless mesh network system 1 includes a node 2300 instead of the node 1300.

Figure 23:
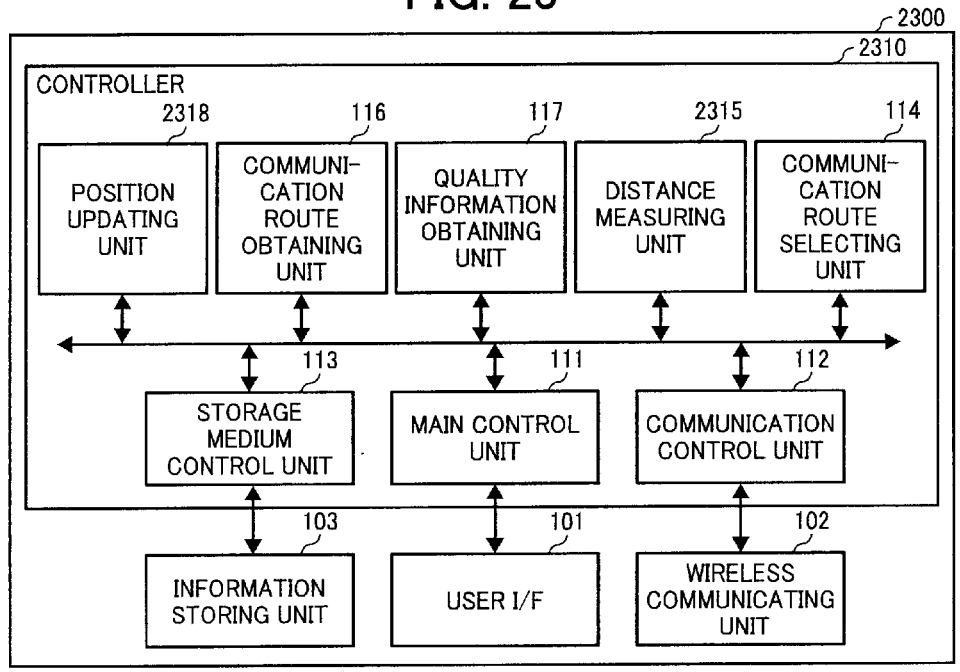
FIG. 23 is a schematic diagram for explaining a functional configuration of a node according to a seventh embodiment of the present invention.

FIG. 23 is a schematic diagram for explaining a functional configuration of the node 2300. Each of the nodes 200 to 600 has an identical functional configuration as that of the node 2300. As shown in FIG. 23, the node 2300 includes the user I/F 101, the wireless communicating unit 102, the information storing unit 103, and a controller 2310. The controller 2310 includes the main control unit 111, the communication control unit 112, the storage medium control unit 113, the communication route selecting unit 114, the communication route obtaining unit 116, the quality information obtaining unit 117, a distance measuring unit 2315, and a position updating unit 2318. Except for the distance measuring unit 2315 and the position updating unit 2318, the constituent elements in the node 2300 have identical configuration as described in the first embodiment.

According to the seventh embodiment, a position database identical to that shown in FIG. 3 and the information regarding the communicable range D as shown in FIG. 10 is stored in the information storing unit 103. The position database includes an identification ID, a node name, and position information of the node 2300 as well as each of the nodes 200 to 600.

The distance measuring unit 2315 measures the distance from each of the nodes 200 to 600 by using any known method proposed in a communication protocol. Subsequently, the position updating unit 2318 determines whether any of the distances is longer than a predetermined distance. When a distance is determined to be longer than the predetermined distance, the position updating unit 2318 certifies that the corresponding node is lying outside the communicable range D and deletes the position information of that node from the position database. Meanwhile, the process of selecting a communication route is identical to the process described in the first embodiment.

Figure 24:
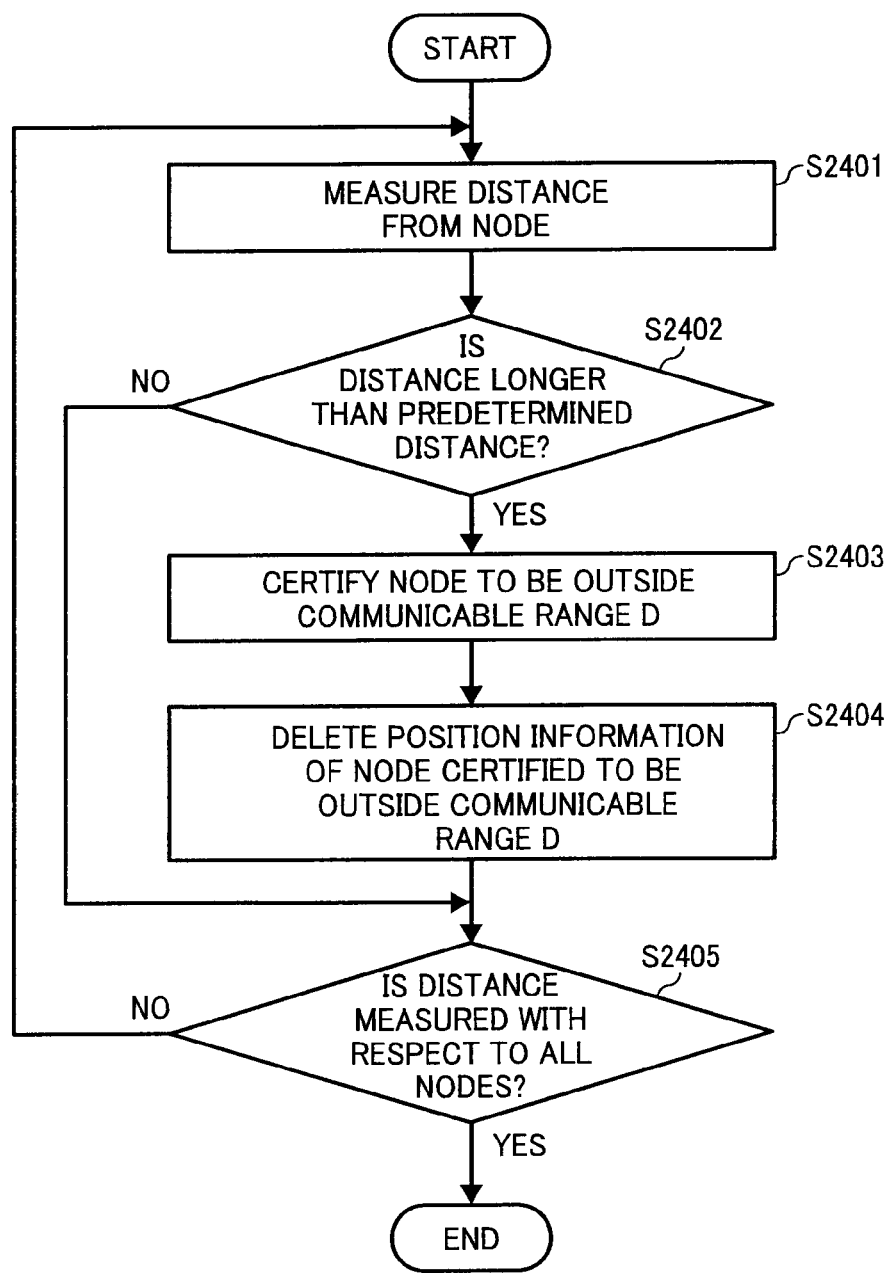
FIG. 24 is a flowchart for explaining a process of updating a position database according to the seventh embodiment.

FIG. 24 is a flowchart for explaining a process of updating the position database.

First, the distance measuring unit 2315 measures the distance from one of the nodes 200 to 600 (Step S2401). Then, the position updating unit 2318 determines whether the distance is longer than a predetermined distance (Step S2402). When the distance is determined to be longer than the predetermined distance (Yes at Step S2402), the position updating unit 2318 certifies that the corresponding node is lying outside the communicable range D (Step S2403) and deletes the position information of that node from the position database (Step S2404).

When the distance is determined to be equal to or shorter than the predetermined distance (No at Step S2402), the position database is not updated. The process from Step S2401 to Step S2404 is repeated with respect to each of the nodes 200 to 600 (Step S2405).

In this way, the position database is updated when a node is moved outside the communicable range D.

Meanwhile, instead of updating the position database, it is also possible to update a distance database identical to that shown in FIG. 6.

Given below is the description of the wireless mesh network system 1 according to an eighth embodiment of the present invention in which heightwise distances of the nodes are taken into consideration while selecting a communication route (see FIG. 11) and, based on the heightwise distances, a different communication protocol is implemented for transmission.

The description is given with reference to the wireless mesh network system 1 shown in FIG. 12 except that the wireless mesh network system 1 includes a node 2500 instead of the node 1300.

Figures 25, 26:
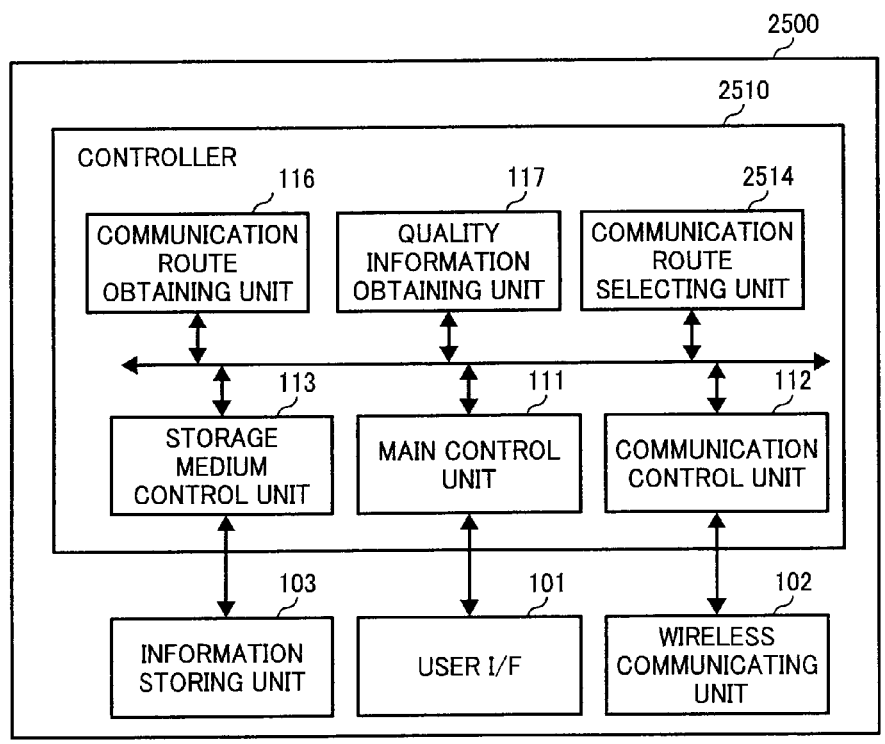
FIG. 25 is a schematic diagram for explaining a functional configuration of a node according to an eighth embodiment of the present invention.
FIG. 26 is a table for explaining an exemplary distance database stored in the node shown in FIG. 25.

FIG. 25 is a schematic diagram for explaining a functional configuration of the node 2500. Each of the nodes 200 to 600 has an identical functional configuration as that of the node 2500. As shown in FIG. 25, the node 2500 includes the user I/F 101, the wireless communicating unit 102, the information storing unit 103, and a controller 2510. The controller 2510 includes the main control unit 111, the communication control unit 112, the storage medium control unit 113, the communication route obtaining unit 116, the quality information obtaining unit 117, and a communication route selecting unit 2514. Except for the communication route selecting unit 2514, the constituent elements in the node 2500 have identical configuration as described in the first embodiment.

According to the eighth embodiment, a distance database is stored in the information storing unit 103. The distance database includes information regarding a coplanar distance and a heightwise distance from each of the nodes 200 to 600. FIG. 26 is a table for explaining an exemplary distance database stored in the information storing unit 103.

The communication route selecting unit 2514 selects a communication route by performing the process described in the first embodiment. Subsequently, the communication route selecting unit 2514 determines whether the heightwise distance from the subsequent node in the selected communication route is equal to or longer than a predetermined distance. If the heightwise distance from the subsequent node is determined to be equal to or longer than the predetermined distance, the communication route selecting unit 2514 selects the IEEE 802.11a standard (having a usable frequency of 5.2 gigahertz) as a high frequency communication protocol for communication that has a higher frequency than a predetermined frequency (e.g. 3.0 gigahertz). On the other hand, if the heightwise distance from the subsequent node is determined to be shorter than the predetermined distance, the communication route selecting unit 2514 selects either one of the IEEE 802.11b standard and the IEEE 802.11g (having a usable frequency of 2.4 gigahertz) as a low frequency communication protocol for communication that has a lower frequency than the predetermined frequency. Subsequently, the wireless communicating unit 102 transmits a wireless signal to the subsequent node by using the selected communication protocol. Meanwhile, the high frequency communication protocol is not limited to the IEEE 802.11a standard, and the low frequency communication protocol is not limited to the IEEE 802.11b standard or the IEEE 802.11g standard. For example, consider a case when the subsequent node is arranged at an elevated position near the ceiling and the heightwise distance from the subsequent node is equal to or longer than the predetermined distance. Then, it can be assumed that no obstacle lies in the communication route up to the subsequent node. In that case, it is desirable to use a high frequency communication protocol that has a non-diffracting property for transmitting a wireless signal. On the other hand, consider a case when the subsequent node is arranged at about the same level and the heightwise distance from the subsequent node is shorter than the predetermined distance. Then, it can be assumed that an obstacle such as a table or a chair lies in the communication route up to the subsequent node. In that case, it is desirable to use a low frequency communication protocol that has a diffracting property for transmitting a wireless signal.

Figure 27:
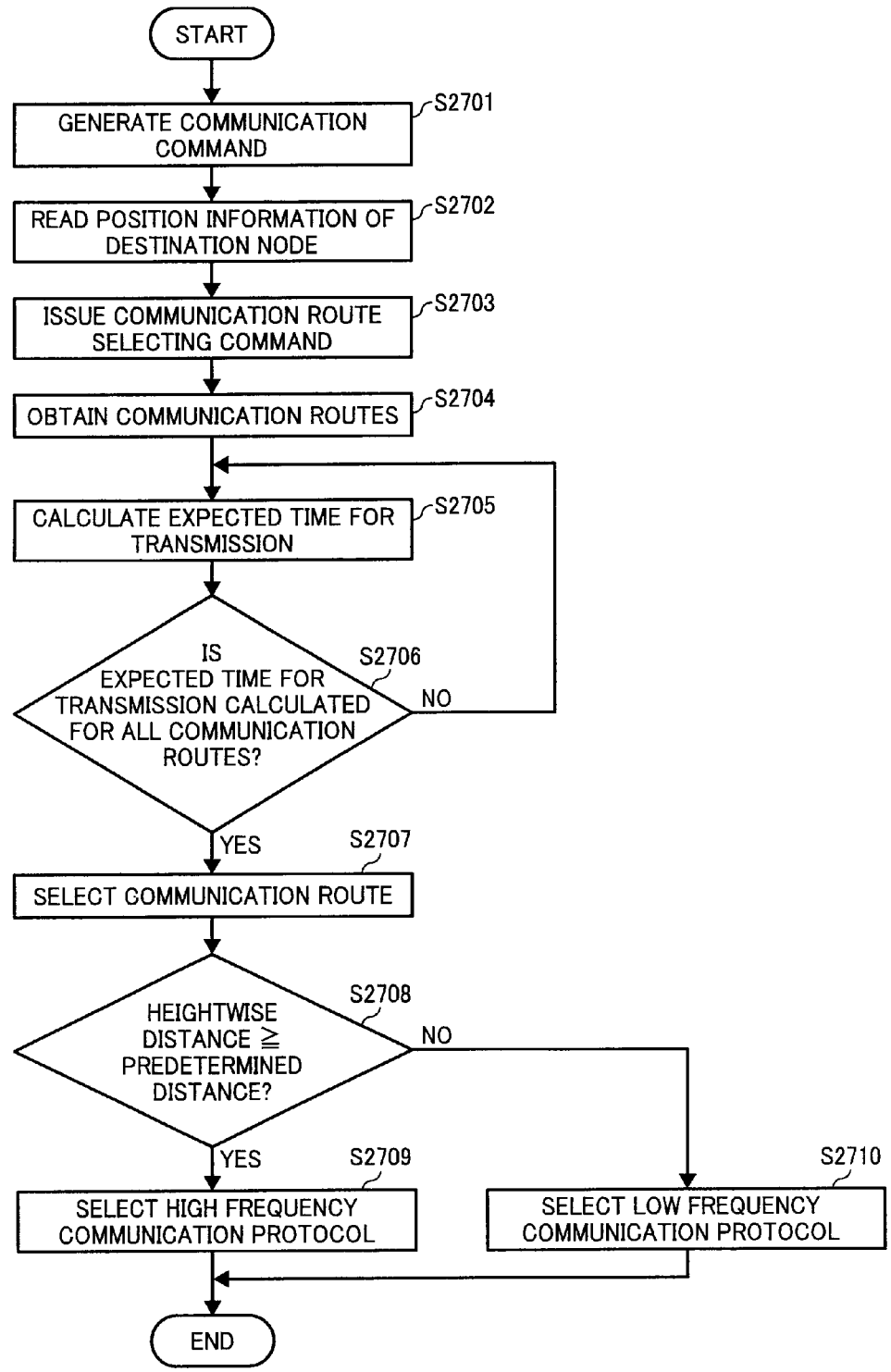
FIG. 27 is a flowchart for explaining a process of selecting a communication route according to the eighth embodiment.

FIG. 27 is a flowchart for explaining a process of selecting a communication route according to the eighth embodiment. The process from the generation of a communication command (Step S2701) up to the selection of a communication route (Step S2707) is identical to the process from Steps S501 to S507 in FIG. 5. Upon selecting a communication route (Step S2707), the communication route selecting unit 2514 reads from the distance database the heightwise distance from the subsequent node in the selected communication route and determines whether that heightwise distance is equal to or longer than a predetermined distance (Step S2708). When the heightwise distance from the subsequent node is determined to be equal to or longer than the predetermined distance (Yes at Step S2708), the communication route selecting unit 2514 selects the IEEE 802.11a standard as a high frequency communication protocol for communication that has a higher frequency than a predetermined frequency (Step S2709). When the heightwise distance from the subsequent node is determined to be shorter than the predetermined distance (No at Step S2708), the communication route selecting unit 2514 selects either one of the IEEE 802.11b standard and the IEEE 802.11g as a low frequency communication protocol for communication that has a lower frequency than the predetermined frequency (Step S2710). Subsequently, the wireless communicating unit 102 transmits a wireless signal to the subsequent node by using the selected communication protocol.

In this way, by taking into consideration the heightwise distances of the nodes, the wireless signal can be transmitted speedily.

Given below is the description of the wireless mesh network system 1 according to a ninth embodiment of the present invention. According to the ninth embodiment, a communication route is selected by using signal quality information that includes a reception power ratio of each node corresponding to a plurality of communication protocols. Moreover, the transmission power is controlled based on the reception power ratios.

The description is given with reference to the wireless mesh network system 1 shown in FIG. 12 except that the wireless mesh network system 1 includes a node 2800 instead of the node 1300.

Figures 28, 29:
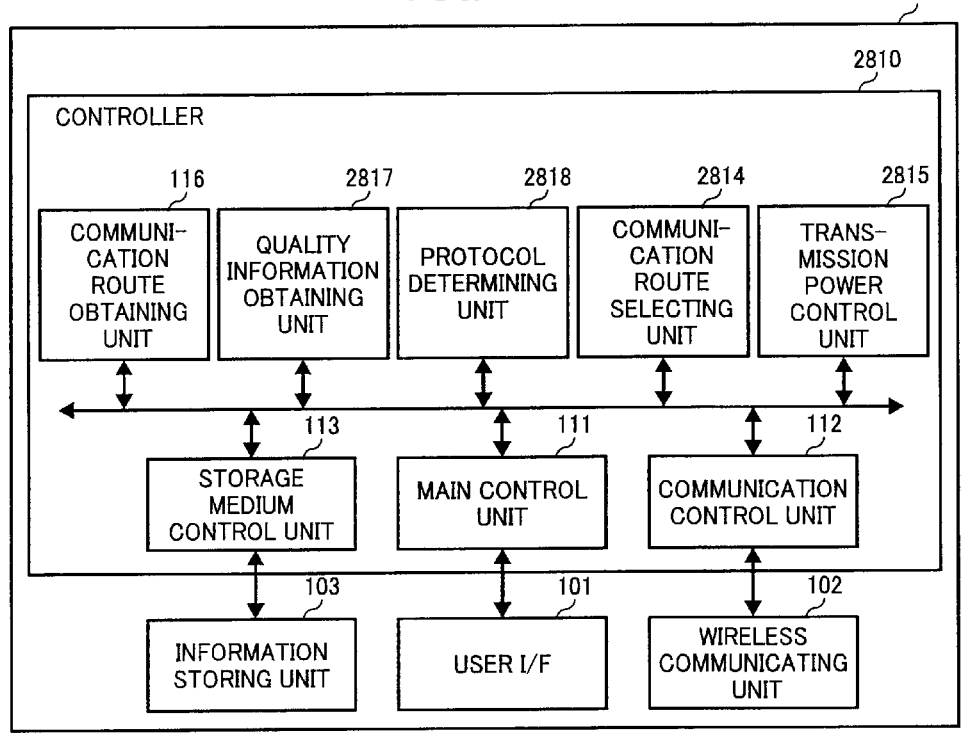
FIG. 28 is a schematic diagram for explaining a functional configuration of a node according to a ninth embodiment of the present invention.
FIG. 29 is a table for explaining an exemplary signal quality database stored in the node shown in FIG. 28.

FIG. 28 is a schematic diagram for explaining a functional configuration of the node 2800. Each of the nodes 200 to 600 has an identical functional configuration as that of the node 2800. As shown in FIG. 28, the node 2800 includes the user I/F 101, the wireless communicating unit 102, the information storing unit 103, and a controller 2810. The controller 2810 includes the main control unit 111, the communication control unit 112, the storage medium control unit 113, the communication route obtaining unit 116, a communication route selecting unit 2814, a transmission power control unit 2815, a quality information obtaining unit 2817, and a protocol determining unit 2818. Except for the communication route selecting unit 2814, the transmission power control unit 2815, the quality information obtaining unit 2817, and the protocol determining unit 2818, the constituent elements in the node 2800 have identical configuration as described in the first embodiment.

According to the ninth embodiment, a signal quality database is stored in the information storing unit 103. FIG. 29 is a table for explaining an exemplary signal quality database stored in the information storing unit 103. The signal quality database includes an identification ID, a node name, and a reception power ratio of each of the nodes 200 to 600 with respect to a plurality of wireless LAN communication protocols such as the IEEE 802.11a standard, the IEEE 802.11b standard, and the IEEE 802.11g standard. The reception power ratio is a ratio of the transmission power value of the node 2800 and the reception power value of each of the nodes 200 to 600.

The protocol determining unit 2818 determines a wireless LAN communication protocol being currently implemented for receiving a wireless signal (hereinafter, "reception protocol") as well as a wireless LAN communication protocol implemented for transmitting a wireless signal (hereinafter, "transmission protocol").

The quality information obtaining unit 2817 obtains from the signal quality database the reception power ratios corresponding to the reception protocol and calculates the total expected time for transmission via each communication route by using the reception power ratios.

The transmission power control unit 2815 receives a command from the main control unit 111 and controls the transmission power value based on the transmission protocol. That is, the transmission power control unit 2815 varies the transmission power value depending on the transmission protocol. The process of controlling the transmission power is identical to that described in the fifth embodiment.

Figure 30:
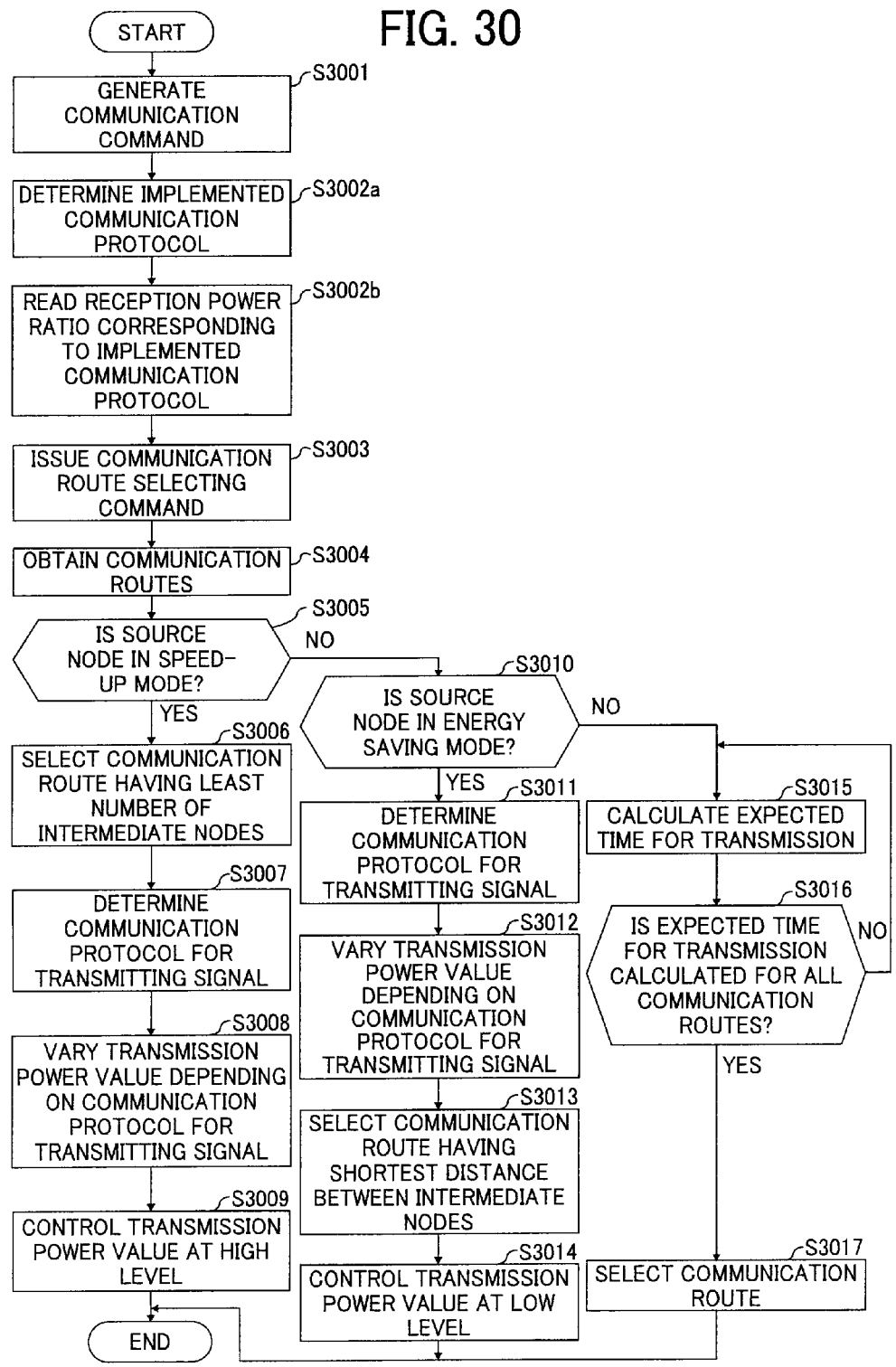
FIG. 30 is a flowchart for explaining a process of selecting a communication route according to the ninth embodiment.

FIG. 30 is a flowchart for explaining a process of selecting a communication route according to the ninth embodiment. First, a communication command is generated in the node 2800 for transmitting a wireless signal to the node 600 (Step S3001). Then, the protocol determining unit 2818 determines which of the IEEE 802.11a standard, the IEEE 802.11b standard, and the IEEE 802.11g standard is implemented as the wireless LAN communication protocol (Step S3002a). Subsequently, the quality information obtaining unit 2817 obtains from the signal quality database the reception power ratios corresponding to the implemented wireless LAN communication protocol (Step S3002b). The subsequent process of obtaining a plurality of communication routes (Step S3003) and determining whether the node 2800 is in the speed-up mode (Step S3005) is performed in an identical manner to that described in the fifth embodiment.

When a communication route that includes the least number of intermediate nodes is selected (Step S3006), the protocol determining unit 2818 determines the transmission protocol (Step S3007). The transmission power control unit 2815 then varies the transmission power value depending on the transmission protocol (Step S3008) and controls the transmission power value at a high level (Step S3009).

When the node 2800 is determined not to be in the speed-up mode (No at Step S3005), it is determined whether the node 2800 is in the energy saving mode (Step S3010). When the node 2800 is determined to be in the energy saving mode (Yes at Step S3010), then the protocol determining unit 2818 determines the transmission protocol (Step S3011). The transmission power control unit 2815 then varies the transmission power value depending on the transmission protocol (Step S3012), selects a communication route that includes the shortest inter-node communication paths (Step S3013), and controls the transmission power value at a low level (Step S3014).

In this way, the total expected time for transmission is calculated by taking into consideration the reception power corresponding to the implemented wireless LAN communication protocol. Thus, a communication route can be selected via which the transmission of a wireless signal can be completed at the earliest. Moreover, irrespective of whether a communication route has a high rate of degradation in the signal quality, it is possible to save energy as well as speed up the transmission depending on the implemented wireless LAN communication protocol.

Meanwhile, if the transmission protocol determined at step S3007 is different than the reception protocol, then the transmission power control unit 2815 can be configured not to control the transmission power value.

Thus, according to an aspect of the present invention, a communication route can be selected from among a plurality of communication routes in a wireless mesh network system such that a wireless signal can be transmitted at the earliest.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication device that performs a wireless communication with a communication target device via an intermediate device, the wireless communication device comprising:
   a route-information obtaining unit that obtains communication route information indicating a communication route to the communication target device;
   a quality-information obtaining unit that obtains quality information indicating quality of a signal received by a device included in the communication route indicated by the communication route information; and
   a route selecting unit that selects an optimum communication route to the communication target device based on the quality information,
   wherein the quality information includes distance information indicating a distance between devices that exchange a signal on the communication route; and
   the route selecting unit selects the optimum communication route based on the distance information included in the quality information.

2. The wireless communication device according to claim 1, further comprising an information storing unit that stores therein the quality information, wherein
the quality-information obtaining unit obtains the quality information from the information storing unit.

3. The wireless communication device according to claim 1, wherein the quality-information obtaining unit obtains the quality information from a result of wireless communication performed by either one of the wireless communication device and a device included in the communication route.

4. The wireless communication device according to claim 1, further comprising:
a distance-information database in which the distance information is registered for each device;
a distance measuring unit that measures a distance with a device at a fixed position; and
an updating unit that determines whether a measured distance is different from a corresponding distance indicated by the distance information registered in the distance-information database, and when it is determined that the measured distance is different from the corresponding distance, updates the distance-information database with the measured distance.

5. The wireless communication device according to claim 1, further comprising a distance-information database in which the distance information and heightwise distance information indicating a heightwise distance between devices that exchange a signal on the communication route are registered for each device, wherein
when a heightwise distance with a next-node device is equal to or longer than a predetermined threshold, the route selecting unit determines to perform a communication with a high-frequency communication protocol, and otherwise, to perform the communication with a low-frequency communication protocol.

6. The wireless communication device according to claim 1, wherein
the quality information includes position information indicating a position of a device included in the communication route, and
the route selecting unit selects the optimum communication route based on the position information included in the quality information.

7. The wireless communication device according to claim 6, further comprising:
a position-information database in which the position information is registered for each device;
a distance measuring unit that measures a distance with other device; and
an updating unit that determines whether a measured distance is longer than a predetermined threshold, and when the measured distance is longer than the predetermined threshold, updates the position-information database by deleting the position information corresponding to a device for which the measured distance is longer than the predetermined threshold.

8. The wireless communication device according to claim 1, wherein
the quality information includes reception power information indicating a reception power of a signal received by a device included in the communication route indicated by the communication route information, and
the route selecting unit selects the optimum communication route based on the reception power information included in the quality information.

9. The wireless communication device according to claim 8, further comprising:
a signal-quality database in which the quality information including the reception power information is registered for each communication protocol; and
a protocol determining unit that determines a current communication protocol,
wherein the quality-information obtaining unit obtains the quality information including the reception power information corresponding to the current communication protocol.

10. The wireless communication device according to claim 1, wherein
the quality information includes obstacle information indicating an obstacle that degrades the quality of the signal received by the device included in the communication route, and
the route selecting unit selects the optimum communication route based on the obstacle information included in the quality information.

11. The wireless communication device according to claim 1, further comprising a transmission power control unit that controls a transmission power of a signal transmitted by the device included in the communication route based on the quality information.

12. The wireless communication device according to claim 11, further comprising:
a signal-quality database in which the quality information including the reception power information is registered for each communication protocol;
a transmission power control unit that controls a transmission power of a signal transmitted by the device included in the communication route; and
a protocol determining unit that determines a current communication protocol,
wherein the quality-information obtaining unit obtains the quality information including the reception power information corresponding to the current communication protocol, and
the transmission power control unit controls the transmission power based on the reception power information.

13. The wireless communication device according to claim 12, wherein
the protocol determining unit further determines a current communication protocol for transmission and a current communication protocol for reception, and
when the current communication protocol for transmission is different from the current communication protocol for reception, the transmission power control unit does not control the transmission power.

14. The wireless communication device according to claim 11, wherein
the route-information obtaining unit obtains a plurality of pieces of communication route information each indicating a communication route to the communication target device,
the route selecting unit selects a communication route to be passed from among a plurality of communication routes based on number of devices included in the communication route, and
upon the route selecting unit selecting the communication route to be passed based on the number of devices included in the communication route, the transmission power control unit sets the transmission power to a power level higher than a standard power level.

15. The wireless communication device according to claim 11, wherein the route-information obtaining unit obtains a plurality of pieces of communication route information each indicating a communication route to the communication target device, the route selecting unit selects a communication route to be passed from among a plurality of communication routes based on a communication distance with which devices included in the communication route perform a communication with each other, and upon the route selecting unit selecting the communication route to be passed based on the communication distance, the transmission power control unit sets the transmission power to a power level lower than a standard power level.

16. A wireless communication method configured to be executed in a wireless communication device that performs a wireless communication with a communication target device via an intermediate device, the wireless communication method comprising:

obtaining communication route information indicating a communication route to the communication target device;

obtaining quality information indicating quality of a signal received by a device included in the communication route indicated by the communication route information, wherein the quality information includes distance information indicating a distance between devices that exchange a signal on the communication route; and selecting an optimum communication route to the communication target device based on the distance information included in the quality information.

17. A computer program product comprising a non-transitory computer-usable medium having computer-readable program codes embodied in the medium for performing a wireless communication in a wireless communication device that performs the wireless communication with a communication target device via an intermediate device, the computer-readable program codes when executed causing a computer to execute:

obtaining communication route information indicating a communication route to the communication target device;

obtaining quality information indicating quality of a signal received by a device included in the communication route indicated by the communication route information, wherein the quality information includes distance information indicating a distance between devices that exchange a signal on the communication route; and selecting an optimum communication route to the communication target device based on the distance information included in the quality information.

* * * * *